(12) United States Patent
Kramer et al.

(10) Patent No.: US 8,004,492 B2
(45) Date of Patent: Aug. 23, 2011

(54) INTERFACE FOR CONTROLLING A GRAPHICAL IMAGE

(75) Inventors: James F. Kramer, Redwood City, CA (US); Felix Maier, Oberboihingen (DE); Lawrence Kuo, Toronto (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 12/910,156

(22) Filed: Oct. 22, 2010

(65) Prior Publication Data

US 2011/0032187 A1 Feb. 10, 2011

Related U.S. Application Data

(63) Continuation of application No. 11/195,367, filed on Aug. 1, 2005, now Pat. No. 7,821,498, which is a continuation of application No. 09/837,860, filed on Apr. 17, 2001, now Pat. No. 6,924,787.

(60) Provisional application No. 60/197,656, filed on Apr. 17, 2000, provisional application No. 60/197,657, filed on Apr. 17, 2000.

(51) Int. Cl.
 *G06G 5/00* (2006.01)
(52) U.S. Cl. .................. 345/156; 345/163; 345/184
(58) Field of Classification Search .......... 345/156–173; 715/701, 856, 863
See application file for complete search history.

(56) References Cited

U.S. PATENT DOCUMENTS

| | | | | |
|---|---|---|---|---|
| 6,040,825 A * | 3/2000 | Yamamoto et al. | | 345/173 |
| 6,219,034 B1 * | 4/2001 | Elbing et al. | | 345/158 |
| 6,222,523 B1 * | 4/2001 | Harvill et al. | | 345/156 |
| 6,630,922 B2 * | 10/2003 | Fishkin et al. | | 345/156 |
| 6,885,361 B1 * | 4/2005 | Harvill et al. | | 345/156 |
| 6,924,787 B2 * | 8/2005 | Kramer et al. | | 345/156 |
| 7,084,884 B1 * | 8/2006 | Nelson et al. | | 345/619 |
| 2002/0054011 A1 * | 5/2002 | Bruneau et al. | | 345/156 |
| 2002/0084985 A1 * | 7/2002 | Hesley et al. | | 345/163 |
| 2003/0038776 A1 * | 2/2003 | Rosenberg et al. | | 345/156 |
| 2003/0076343 A1 * | 4/2003 | Fishkin et al. | | 345/701 |

* cited by examiner

*Primary Examiner* — Nitin Patel
(74) *Attorney, Agent, or Firm* — Kilpatrick Townsend & Stockton LLP

(57) ABSTRACT

An interface device for interfacing a user with a computer, the computer running an application program and generating a graphical image and a graphical object, comprises a user manipulatable object in communication with the computer, a sensor to detect a manipulation of the object, the sensor providing a signal to the computer to control the graphical image, and an actuator adapted to provide a haptic sensation to the palm of the user in relation to an interaction between the graphical image and the graphical object, the actuator comprising a member that is deformable to provide the haptic sensation. In another version, a mouse for interfacing a user with a computer generating a graphical environment comprising, a graphical hand comprises a housing, a position detector to detect a position of the mouse, the position detector capable of providing a first position signal to the computer to control the position of the graphical hand in the graphical environment, and a finger position detector to detect a position of a finger of the user, the finger position detector capable of providing a second position signal to the computer to control a graphical finger on the graphical hand in relation to the position of the finger of the user.

16 Claims, 24 Drawing Sheets

US 8,004,492 B2

INTERFACE FOR CONTROLLING A GRAPHICAL IMAGE

CROSS REFERENCE TO RELATED APPLICATIONS

This application is a continuation of co-pending U.S. patent application Ser. No. 11/195,367 filed Aug. 1, 2005, entitled "Interface for Controlling a Graphical Image," which is a continuation of U.S. patent application Ser. No. 09/837,860, now U.S. Pat. No. 6,924,787, and entitled, "Interface for Controlling a Graphical Image," filed Apr. 17, 2001 which claims priority from U.S. Provisional Patent Application Nos. 60/197,656 and 60/197,657, both of which were filed on Apr. 17, 2000 and all of which are incorporated herein by reference in their entireties.

BACKGROUND

The present invention relates to interfacing a user with a computer, such as a computer for performing a virtual reality simulation.

Users interface with electronic and mechanical devices in a variety of applications, and the need for a more natural, easy-to-use, and informative interface is a constant concern. In the context of the present invention, a user interfaces with computer devices for a variety of applications. One such application is interacting with computer-generated environments, such as virtual reality environments, including games, surgical simulations, and application programs. Computer input devices such as mice and trackballs are often used to control a cursor within a graphical environment and provide input in these applications.

In some interface devices, force feedback and/or tactile feedback is also provided to the user, collectively known herein as "haptic feedback." For example, haptic versions of joysticks, mice, gamepads, steering wheels, or other types of devices can output forces to the user based on events or interactions occurring within the graphical environment, such as in a game or other application program. In a virtual reality simulation, it is often desirable to graphically represent a user or a portion of the user in the graphical environment and to allow the user to realistically interact with the graphical environment.

SUMMARY

To overcome the deficiencies of the prior art, it is desirable to provide an interface device that improves the interaction of a user with a graphical environment. It is further desirable to provide an interface device that applies realistic haptic sensations to a user. In addition, it is desirable to provide an easily implementable and inexpensive interface device.

The present invention satisfies these needs. In one aspect of the invention, an interface device for interfacing a user with a computer, the computer running an application program and generating a graphical image and a graphical object, comprises a user manipulatable object in communication with the computer, a sensor to detect a manipulation of the object, the sensor providing a signal to the computer to control the graphical image, and an actuator adapted to provide a haptic sensation to the palm, of the user in relation to an interaction between the graphical image and the graphical object, the actuator comprising a member that is deformable to provide the haptic sensation.

In another aspect of the invention, an actuator for providing a haptic sensation to a user interfacing with a computer running an application program comprises a deformable member having a first end, a second end, and an intermediate portion, and a tendon capable of displacing the first end relative to the second end in response to the computer to cause the intermediate portion to contact the user and thereby provide a haptic sensation to the user.

In another aspect of the invention, a mouse for interfacing a user with a computer generating a graphical environment comprising a graphical hand comprises a housing, a position detector to detect a position of the mouse, the position detector capable of providing a first position signal to the computer to control the position of the graphical hand in the graphical environment, and a finger position detector to detect a position of a finger of the user, the finger position detector capable of providing a second position signal to the computer to control a graphical finger on the graphical hand in relation to the position of the finger of the user.

In another aspect of the invention, a mouse for interfacing a user with a computer comprises a housing, a position detector to detect a position of the mouse, a member adapted to contact a finger of the user, the member being capable of being moved by the finger in two directions, and a member position detector to detect a position of the member.

In another aspect of the invention, a method for interfacing a user with a computer running an application program, the computer generating a graphical environment comprising a graphical hand, comprises providing a mouse in communication with the computer, detecting a position of the mouse, controlling the position of the graphical hand in relation to the detected position of the mouse, and controlling a shape of the graphical hand in relation to an amount of manipulation of the mouse.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

Figure 7A:
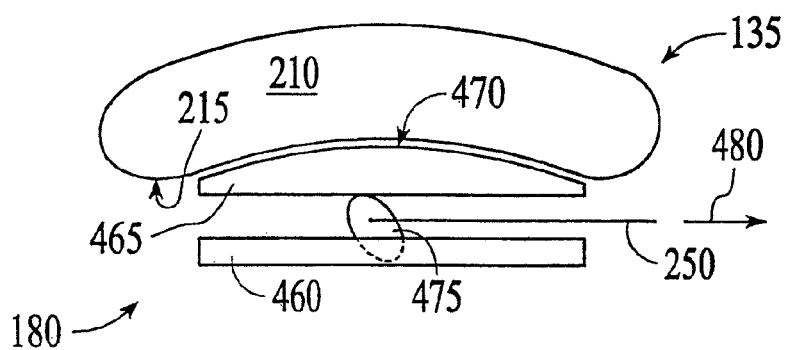
Figure 8:
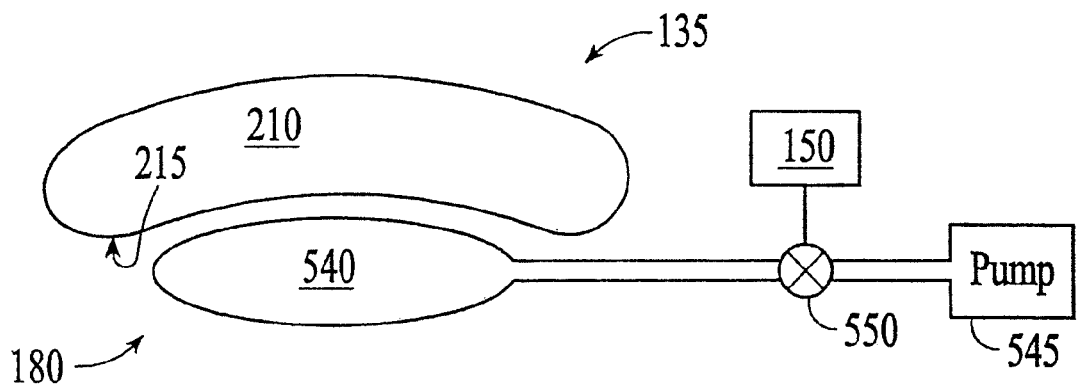
Figure 9:
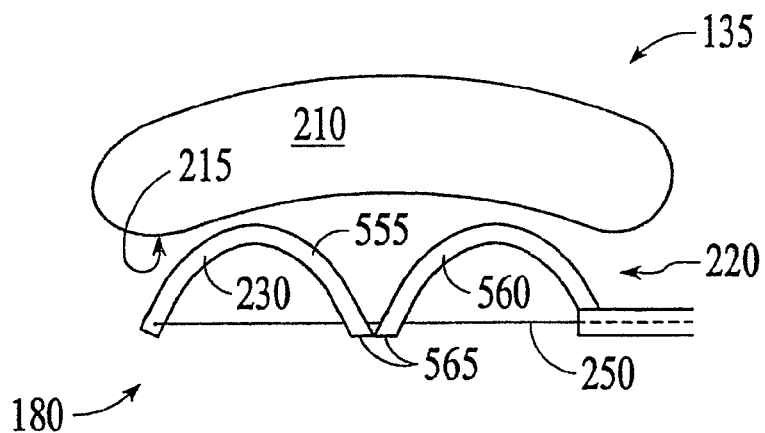
Figure 10:
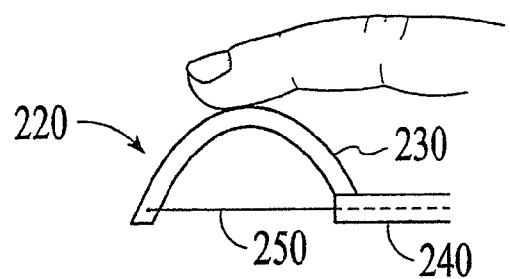
Figure 11:
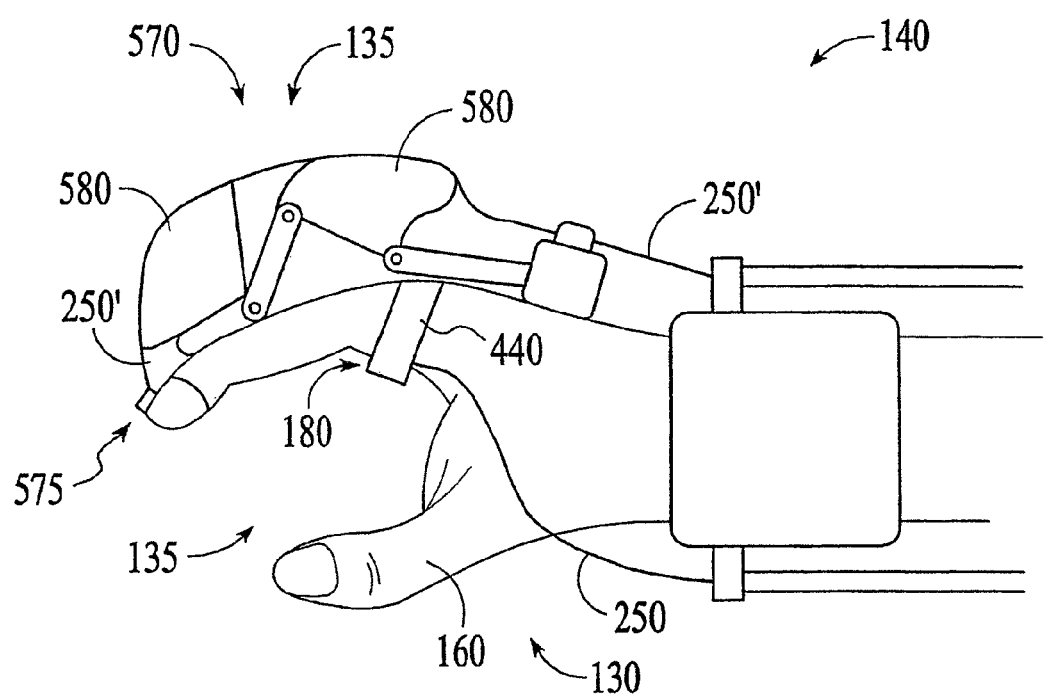
Figure 12:
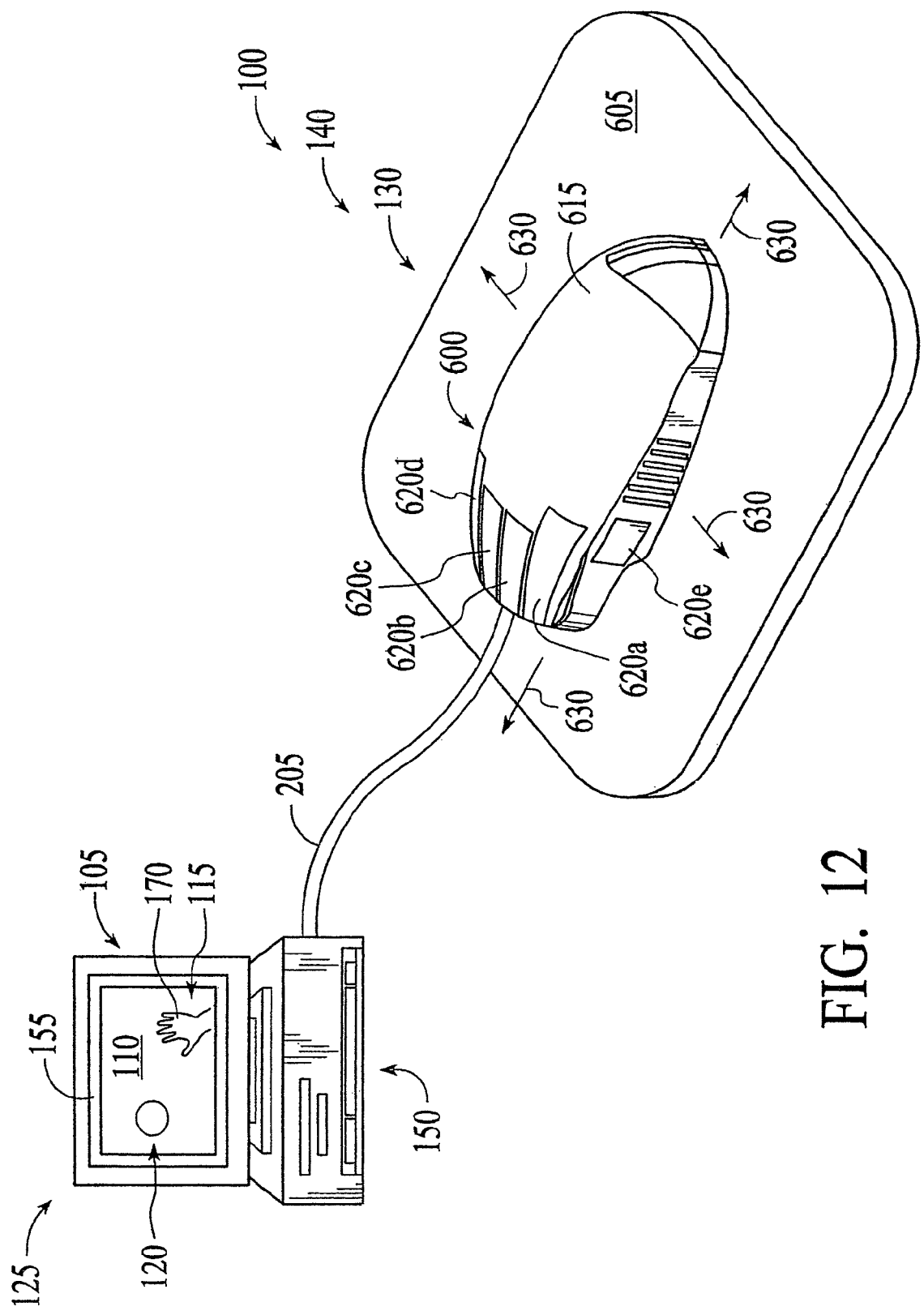
Figure 13:
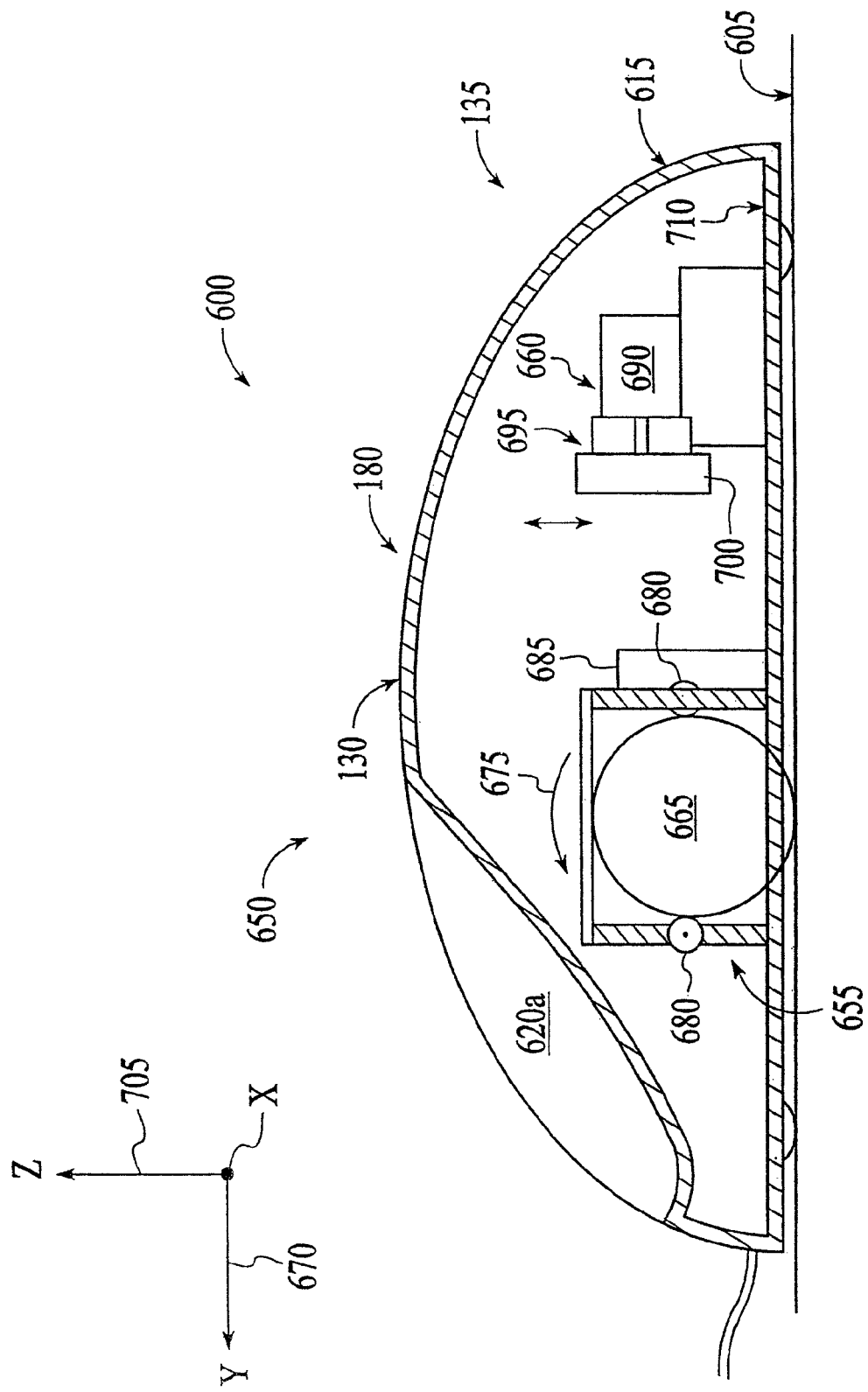
Figure 14:
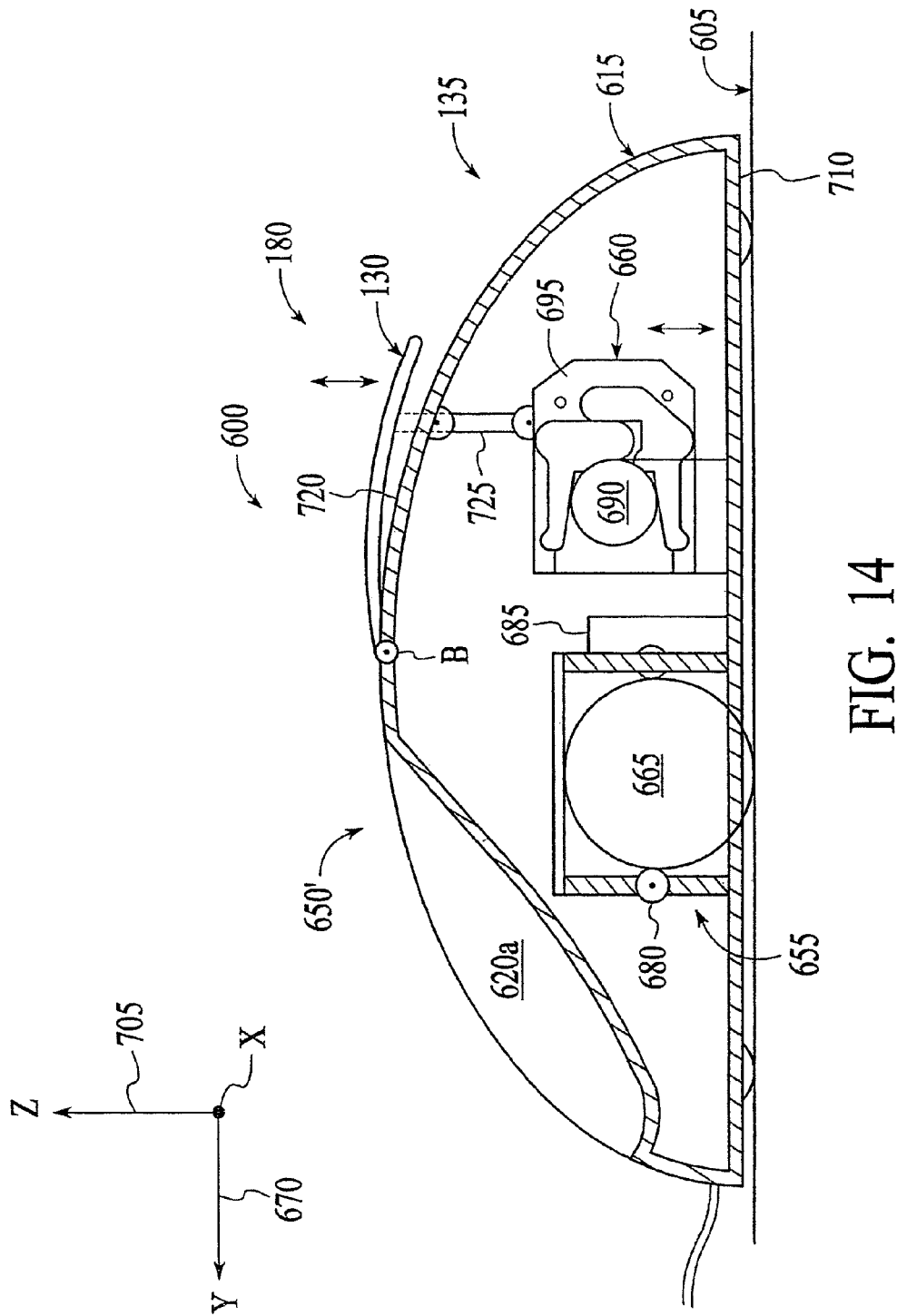
Figure 15:
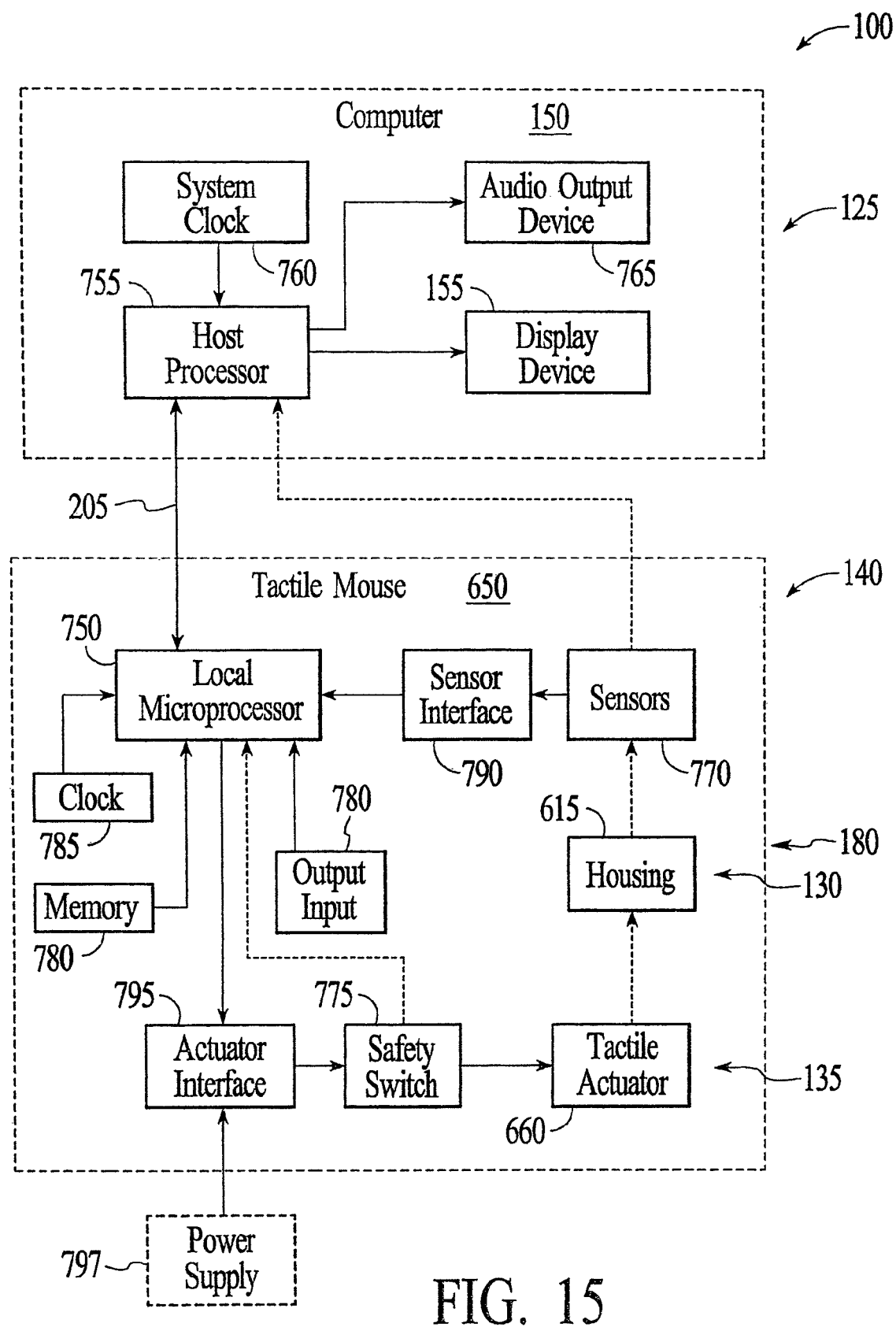
Figure 16:
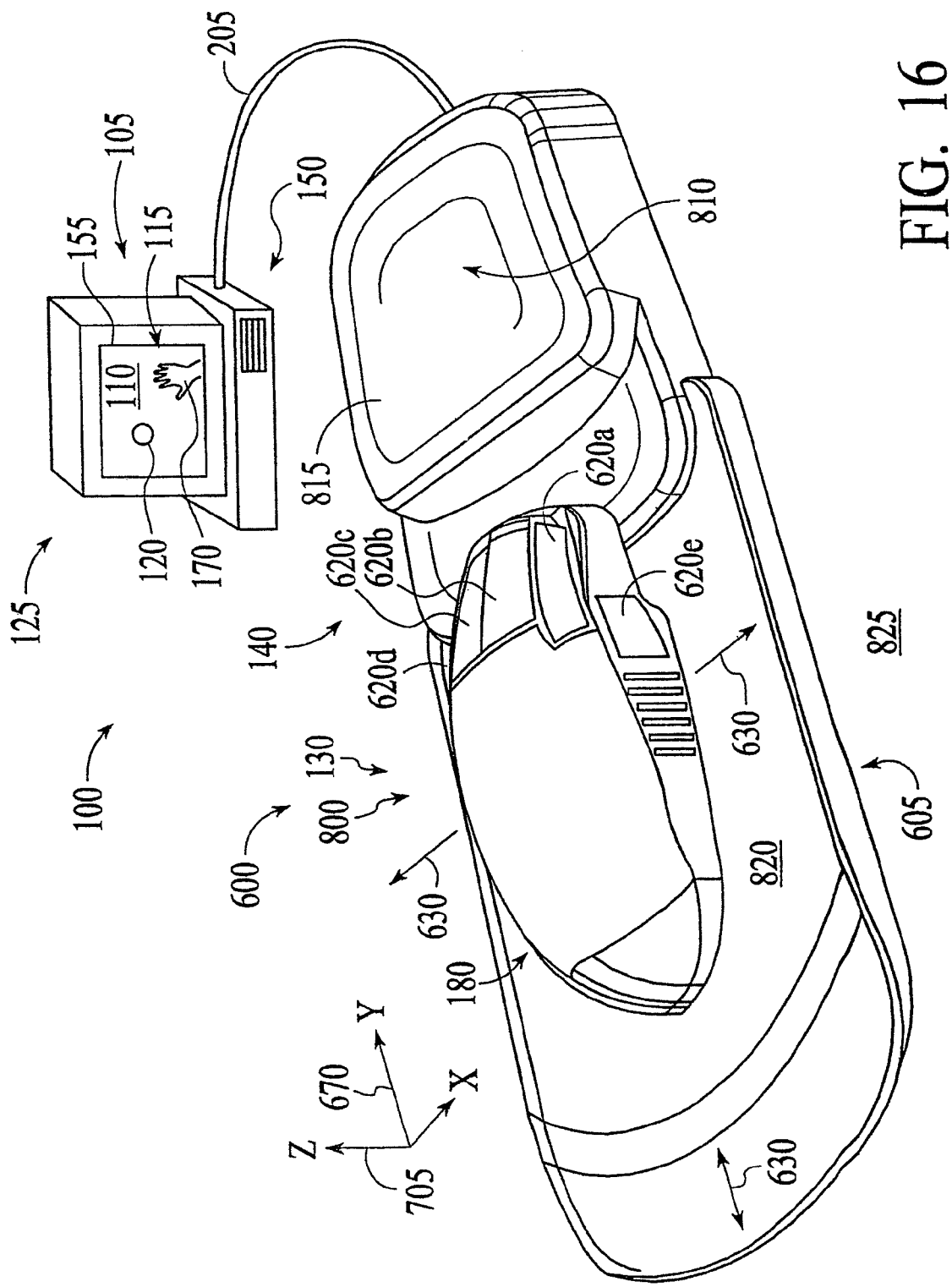
Figure 17A:
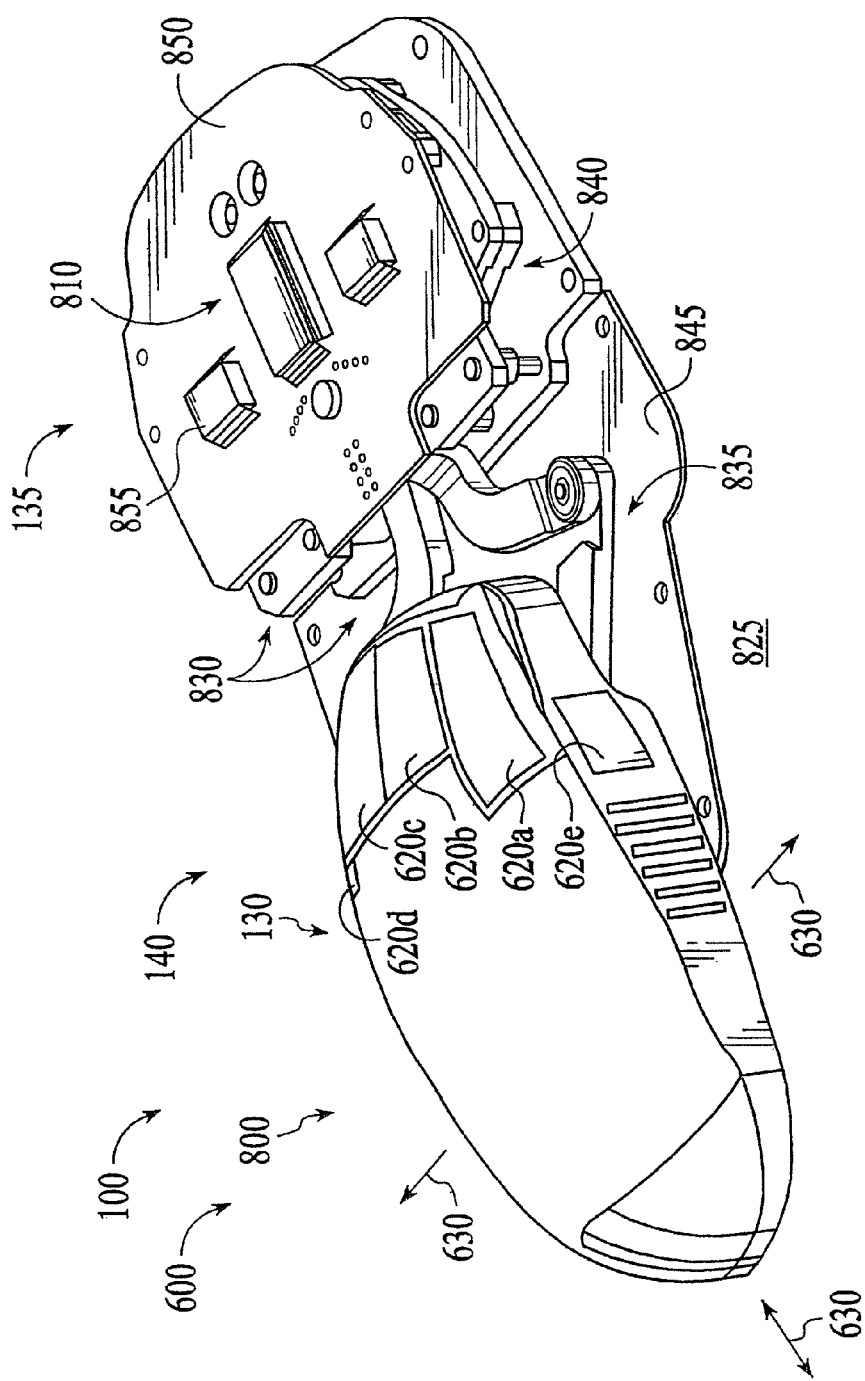
Figure 17B:
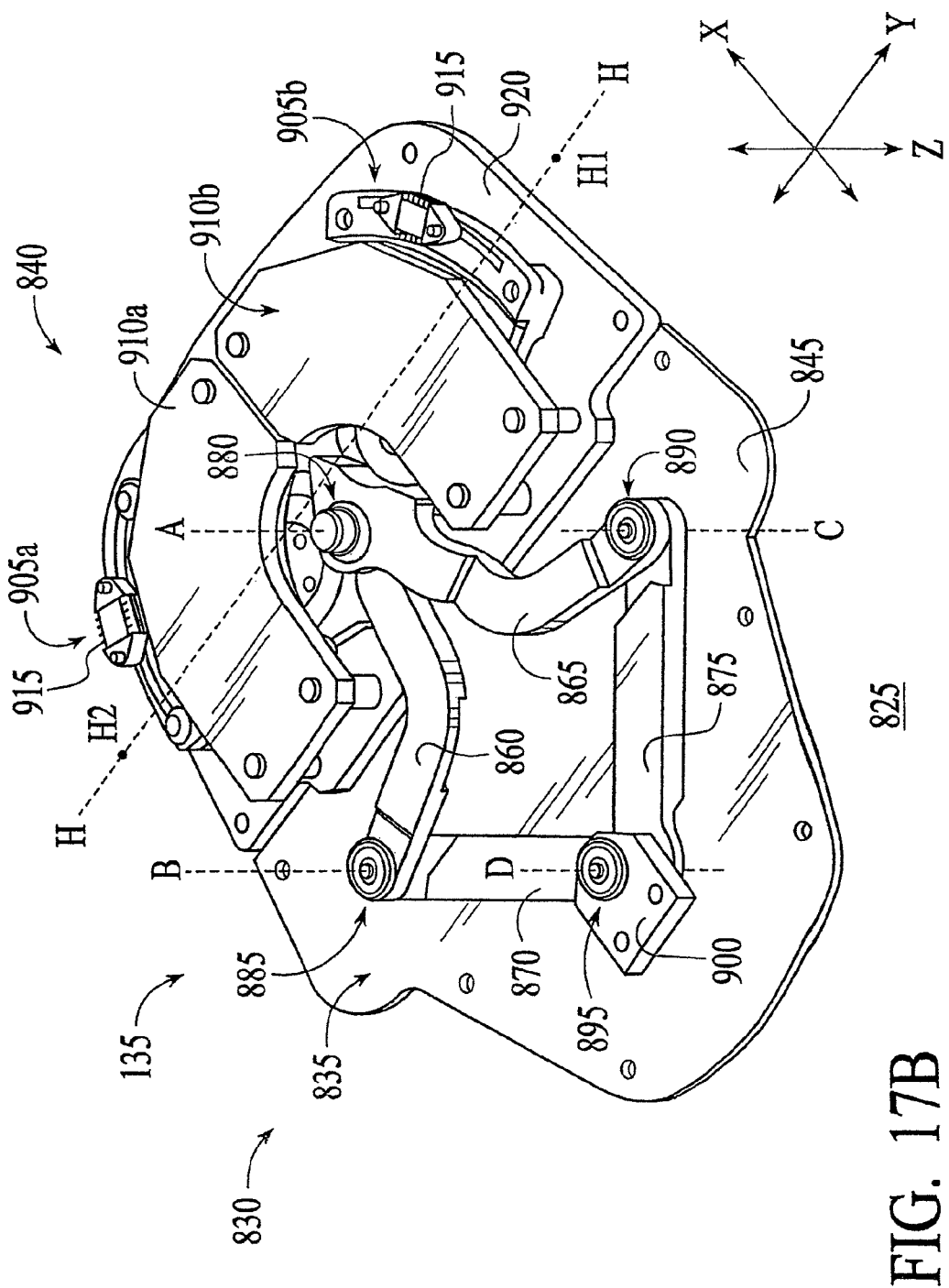
Figure 17C:
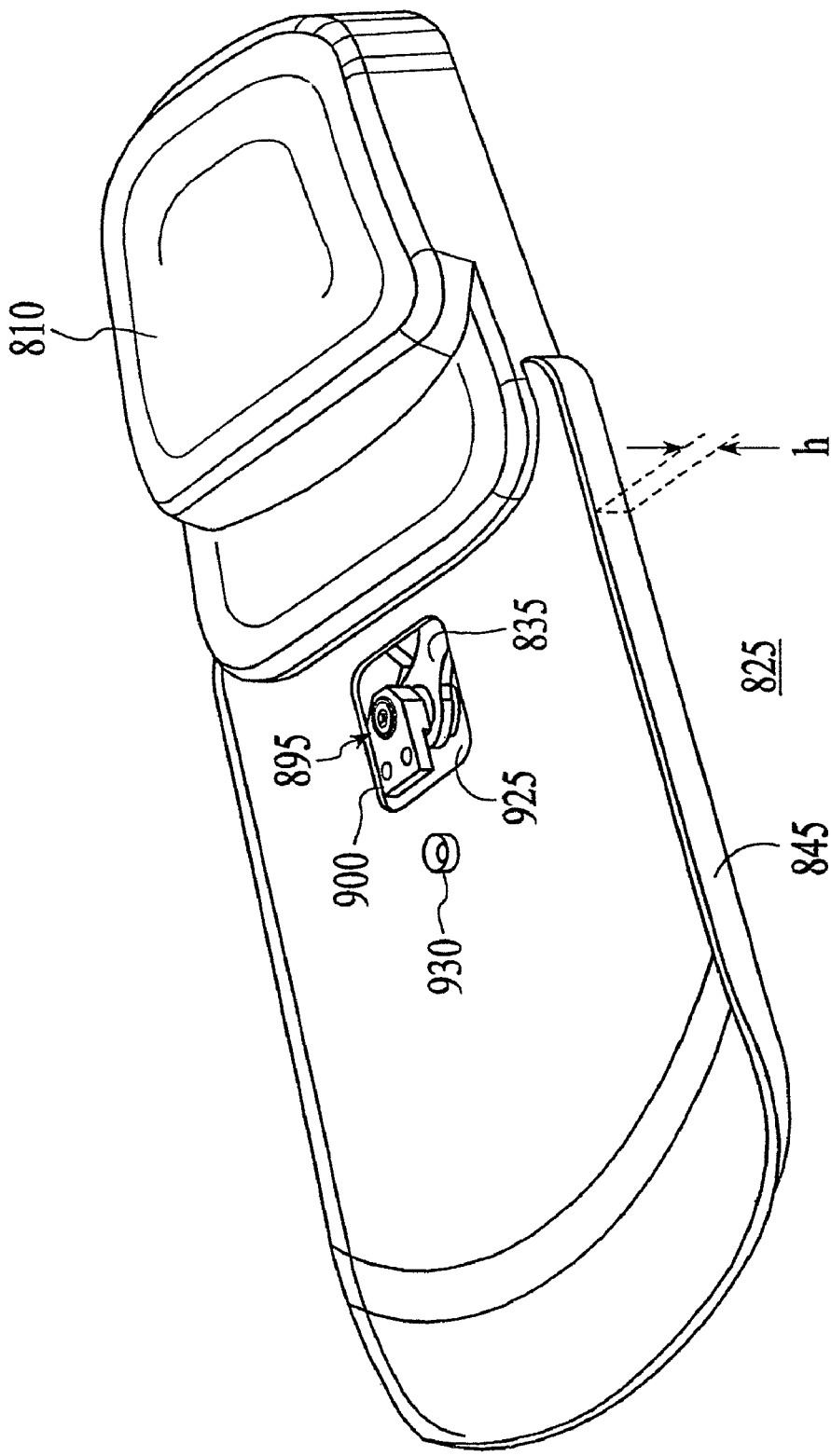
Figure 18:
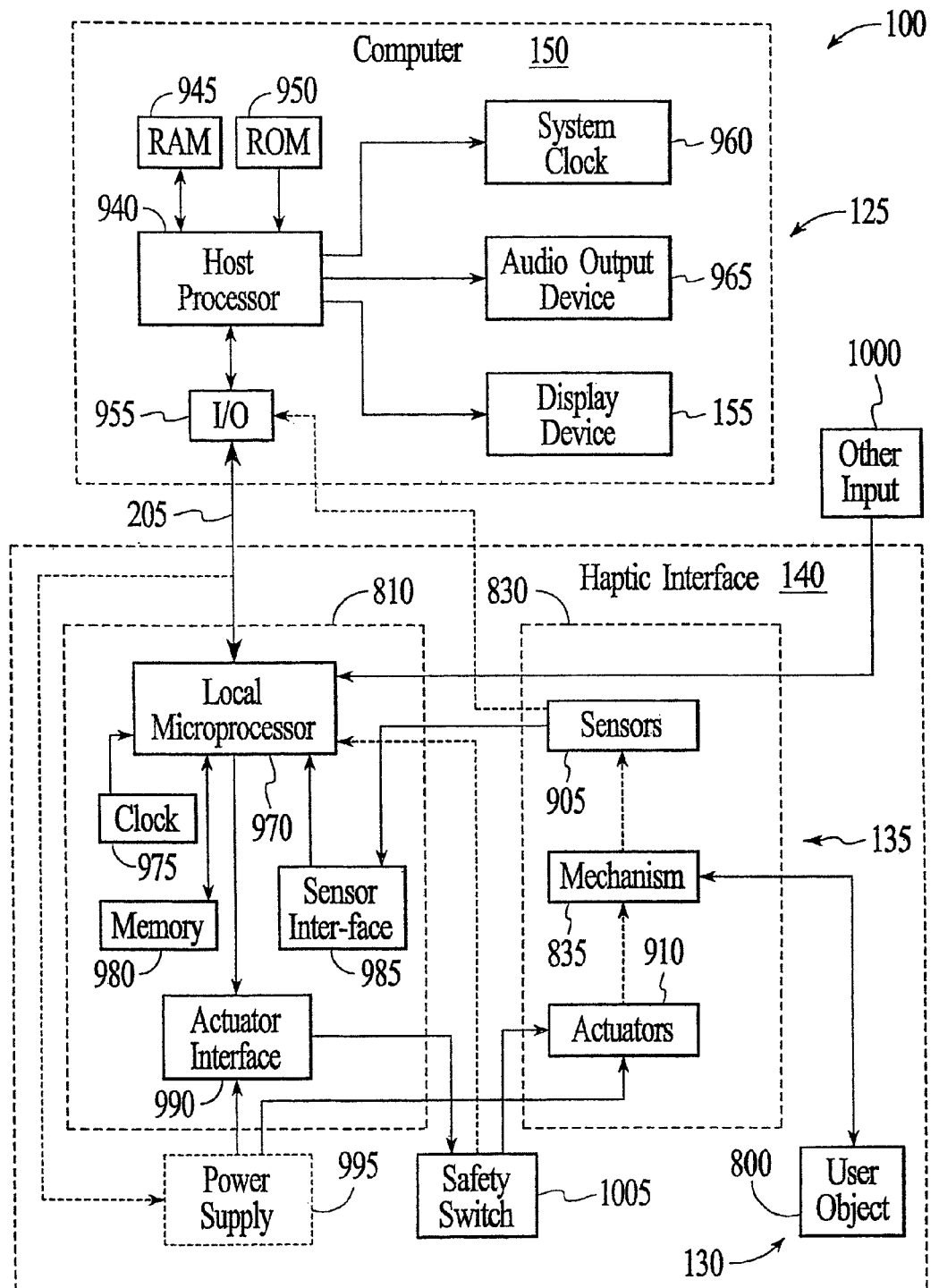
Figure 19A:
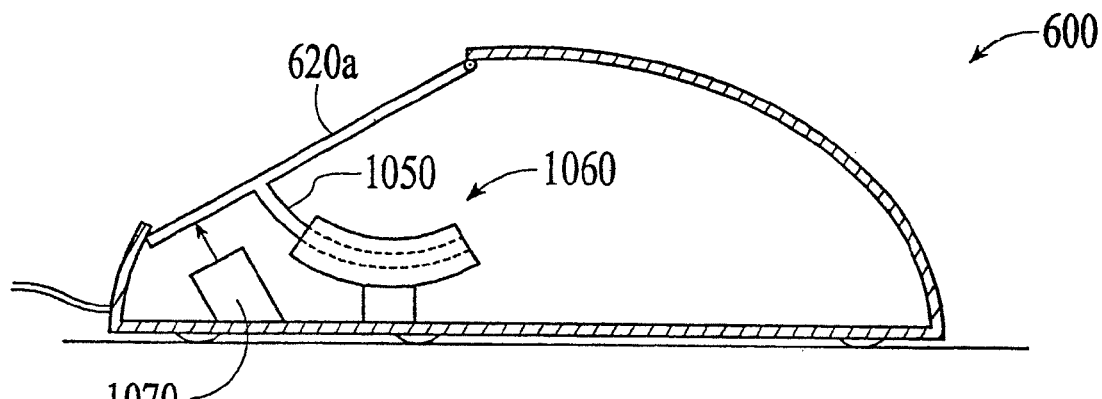
Figure 19B:
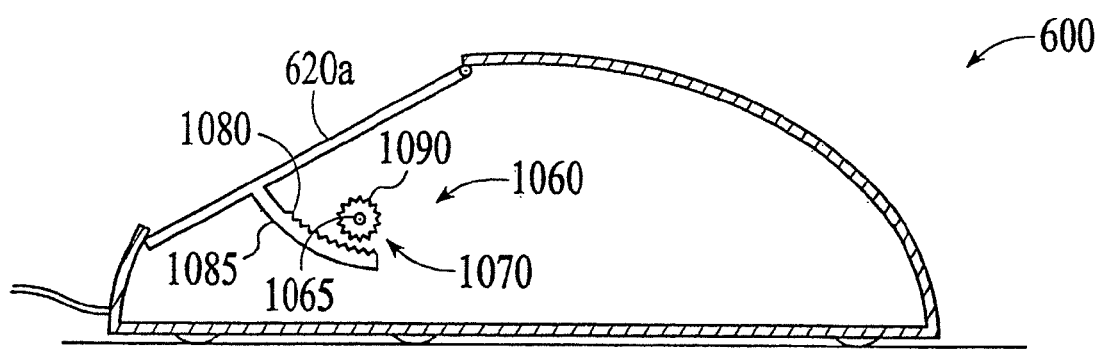
Figure 19C:
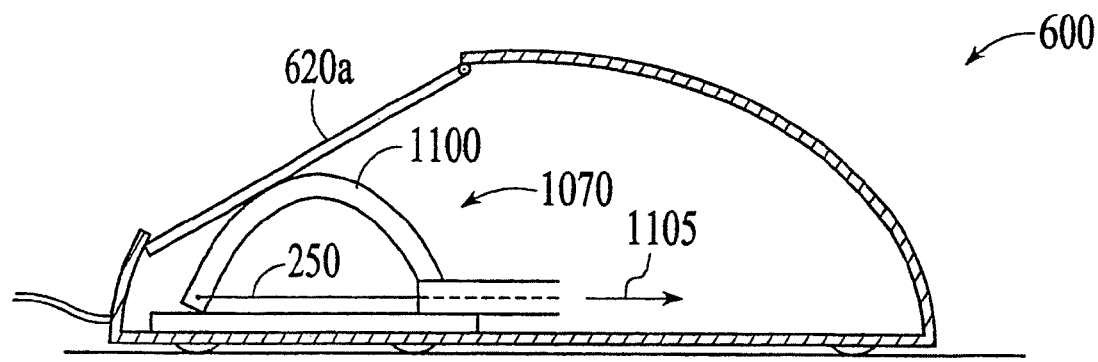
Figure 20A:
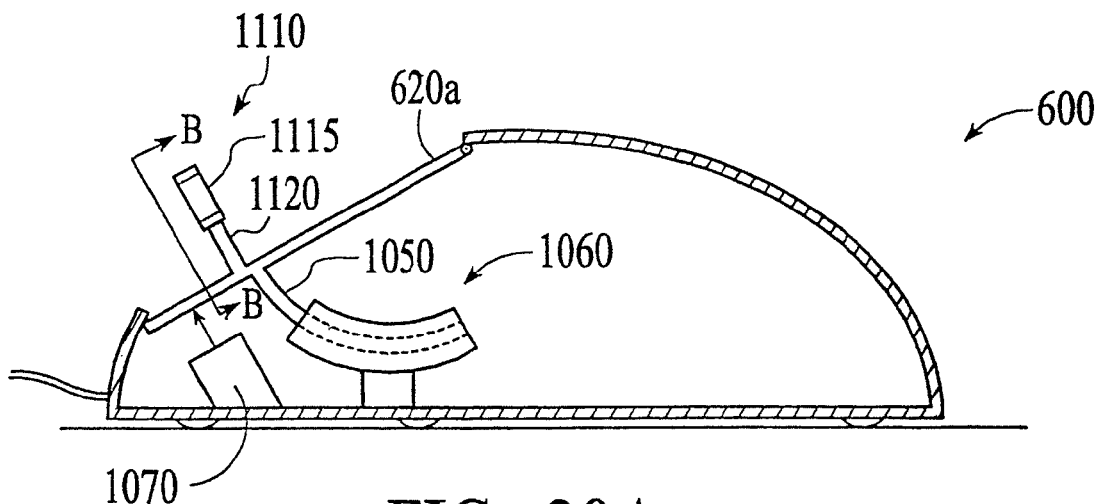
Figure 20B:
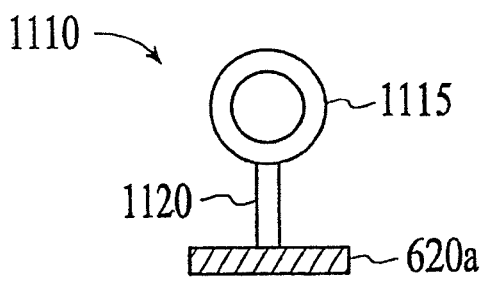
Figure 21:
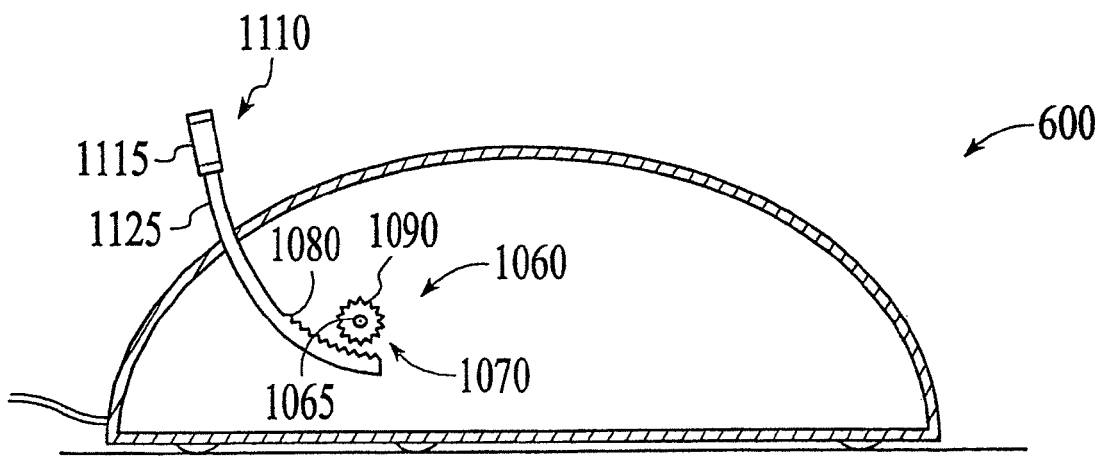
Figure 22:
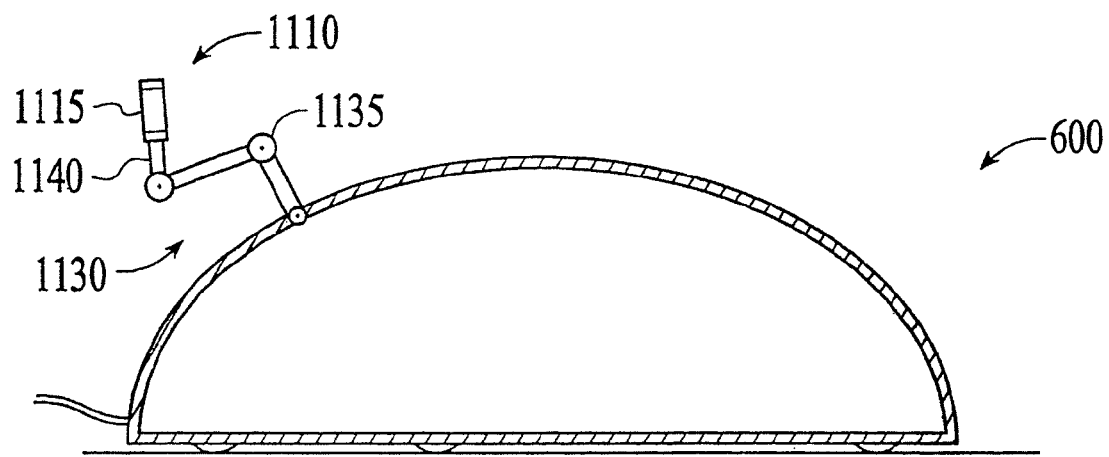
Figure 23A:
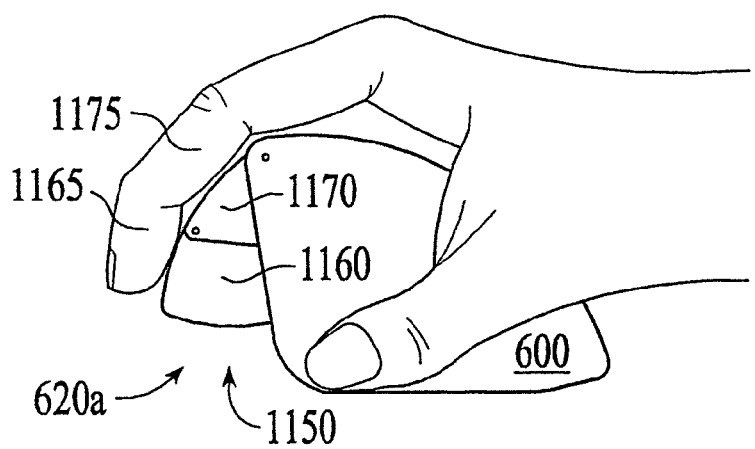
Figure 23B:
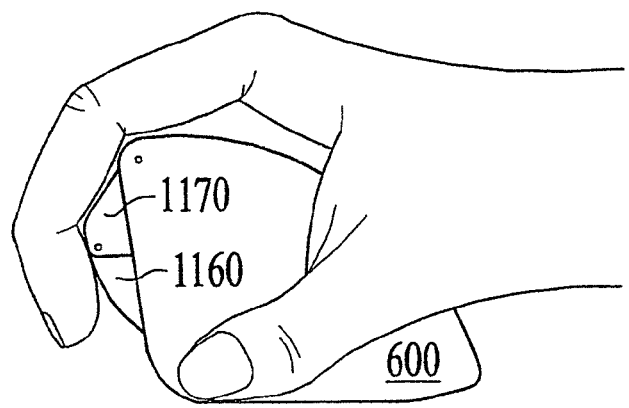
Figure 24:
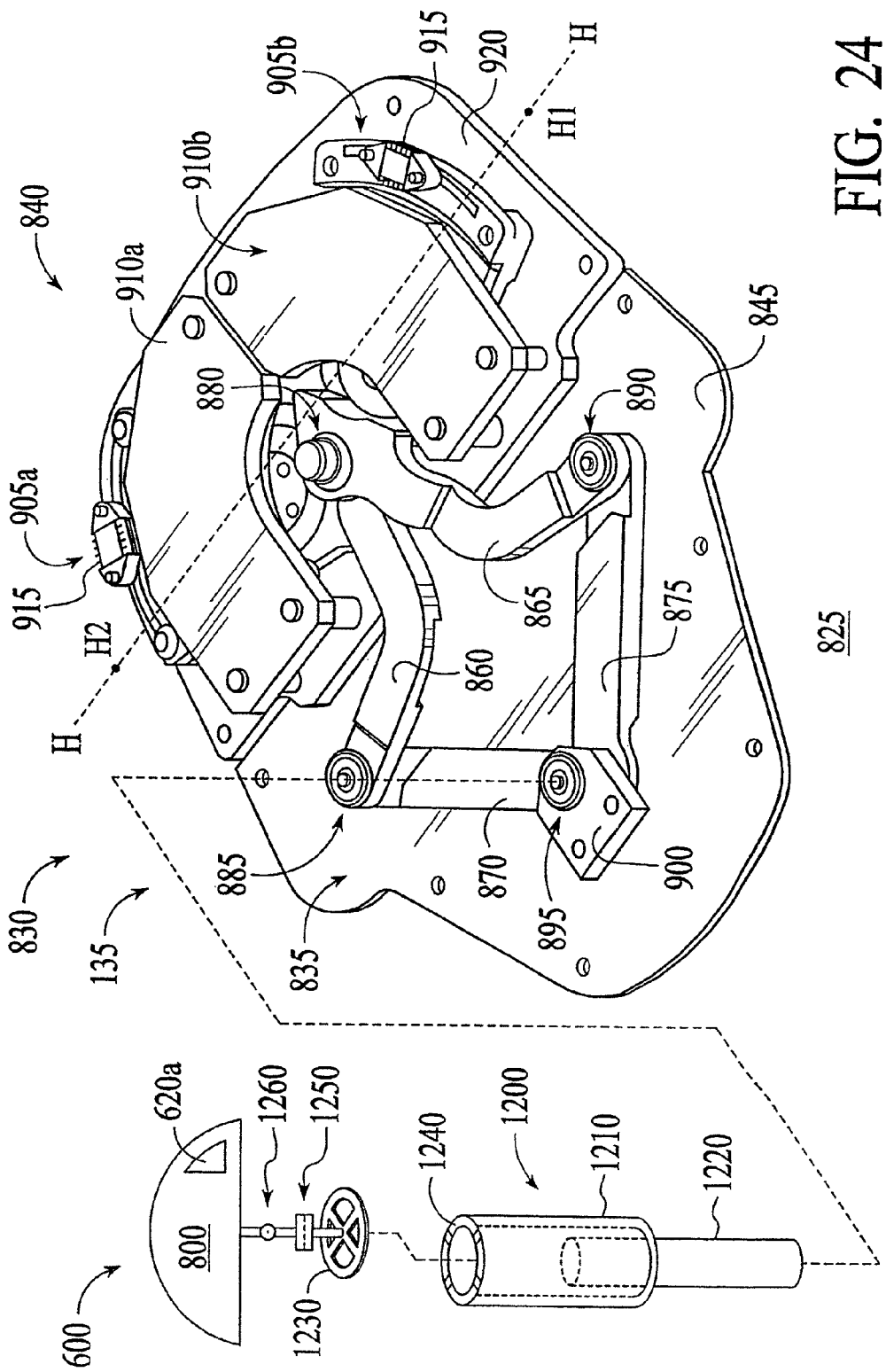
Figure 25A:
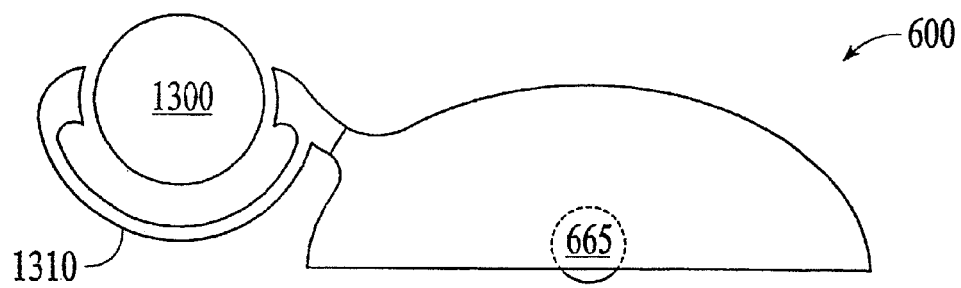
Figure 25B:
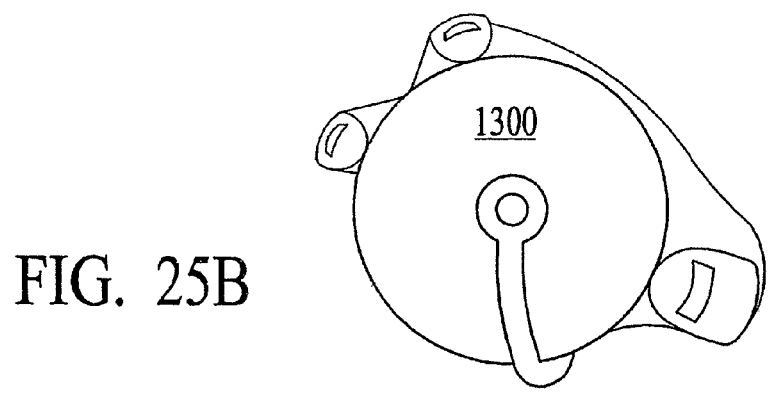
Figure 25C:
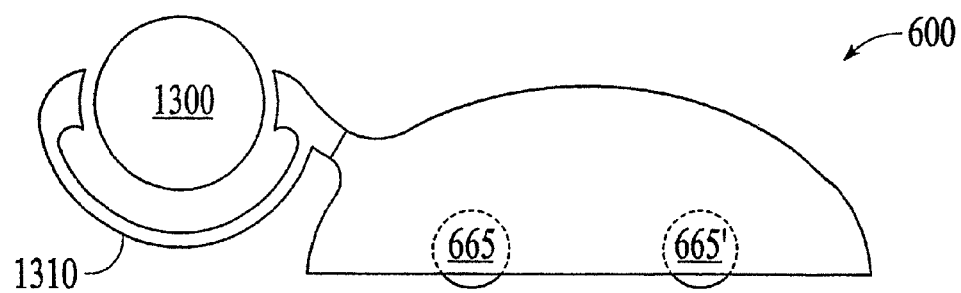

FIGS. 7A though 7D are schematic side views of embodiments of palm forcing mechanisms including cams according to the invention;

FIG. 8 is a schematic sectional side view of an embodiment of a palm forcing mechanism including an inflatable air bladder;

FIG. 9 is a schematic sectional side view of an embodiment of a palm forcing mechanism with multiple contacting points;

FIG. 10 is a schematic sectional side view of an embodiment of a forcing mechanism according to the invention applying a force to a portion of the body other than the palm;

FIG. 11 is a schematic side view of a haptic interface device comprising a palm forcing mechanism and a finger forcing mechanism;

FIG. 12 is a schematic perspective view of a finger sensing mouse;

FIG. 13 is a schematic sectional side view of a version of a tactile finger sensing mouse;

FIG. 14 is a schematic sectional side view, of another version of a tactile finger sensing mouse;

FIG. 15 is a schematic block diagram of a simulation system comprising a tactile mouse;

FIG. 16 is a schematic perspective view, of a version of a force feedback finger sensing mouse;

FIGS. 17A through 17C are schematic perspective views of the forcing mechanism of the version of a force feedback finger sensing mouse of FIG. 16;

FIG. 18 is a schematic block diagram of a simulation system comprising a force feedback finger sensing mouse;

FIGS. 19A through 19C are schematic sectional side views of finger sensing mechanisms usable with a mouse device;

FIG. 20A is a schematic sectional side view of a finger sensing mechanism comprising a finger receiving extension;

FIG. 20B is a schematic view along B-B of the finger receiving extension of FIG. 20A;

FIG. 21 is a schematic sectional side view of another version of a finger sensing mechanism usable with a mouse device;

FIG. 22 is a schematic sectional side view of another version of a finger sensing mechanism usable with a mouse device;

FIGS. 23A and 23B are schematic side views of a finger sensing button comprising multiple portions;

FIG. 24 is a schematic perspective view of a three dimensional finger sensing mouse; and FIGS. 25A through 25C are schematic views of alternative designs for a mouse device.

DESCRIPTION

The present invention relates to virtual reality simulations and more particularly to computer simulations involving the control of a graphical image, such as a graphical image that is a graphical representation of a hand or a portion of a hand. Although the process is illustrated at least partly in the context of controlling a graphical hand, the present invention can be used in other simulation and computer interactive processes and/or to control other graphical images and should not be limited to the examples provided herein.

Figure 1:
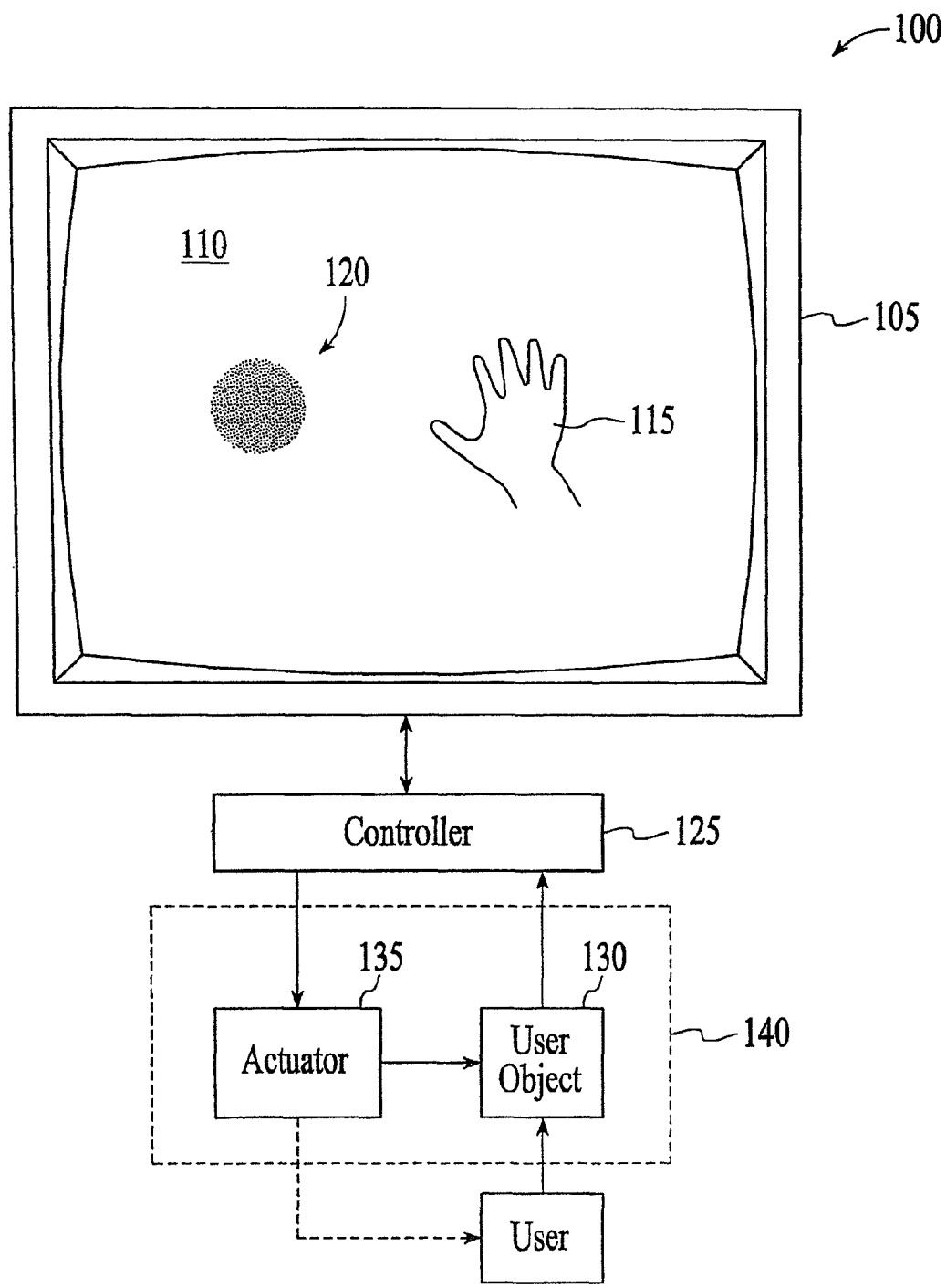
FIG. 1 is a schematic diagram of a simulation system according to the present invention.

FIG. 1 is a schematic illustration of a simulation system 100 according to the invention. The simulation system 100 is capable of generating a virtual reality environment. A display 105 provides a graphical environment 110 to a user. Within the graphical environment 110 is a graphical image 115. The graphical image 115 may be, for example, a cursor or other graphical object, the position, movement, and/or shape of which is controllable. For example, the graphical image 115 may be a pointer cursor, a character in a game, a surgical instrument, a view from the end of a surgical instrument, a representative portion of the user, or the like. Also within the graphical environment is a graphical object 120 such as a ball, as shown, or any other graphical representation including another graphical image that may be controlled by the user or by another user. A controller 125 in communication with the display 105 is capable of generating and/or controlling the graphical environment 110, for example by executing program code including an application program related to the simulation. A user object 130 is manipulatable by a user, and the manipulation of the user object 130 controls the position, orientation, shape and/or other characteristic of the graphical image 115 within the graphical environment 110, for example by directly correlating a position of the user object 130 with a displayed position of the graphical image 115 or by correlating a position of the user object 130 with a rate of movement of the graphical image 115. Either the entire user object 130 may be manipulatable by the user or a portion of the user object 130 may be manipulatable relative to another portion of the user object 130. For example, the user object may be a surface that is engaged by one or more hands of a user, such as a joystick, a mouse, a mouse housing, a stylus, a knob, an elongated rigid or flexible member, an instrumented glove, or the like and may be moveable in from one to six degrees of freedom.

Optionally, haptic feedback may be provided to the user to increase the realism of the virtual reality environment. For example, when a predetermined event occurs within the graphical environment 110, such as an interaction of the graphical image 115 with the graphical object 120, the controller 125 may cause an actuator 135 to output a haptic sensation to the user. In the version shown, the actuator 135 outputs the haptic sensation to the user object 130 through which the sensation is provided to the user. The actuator 135 and the user object 130 may be part of a haptic interface device 140. The actuator 135 may be positioned in the haptic interface device 140 to apply a force to the user object 130 or to a portion of the user object. For example, the haptic interface device 140 may comprise a user object 130, such as a mouse housing, having an actuator 135 within the user object 130, such as a vibrating motor within the mouse housing, or the haptic interface device may comprise a user object 130, such as a mouse, that is mechanically linked to an actuator 135. Alternatively, the actuator 135 and the user object 130 may be separate structures, and the actuator 135 may provide a haptic sensation directly to the user, as shown by the phantom arrow in FIG. 1.

The actuator 135 may provide the haptic sensation actively or passively. For example, the actuator 135 may comprise one or more motors coupled to the user object 130 to apply a force to the user or to the user object 130 in one or more degrees of freedom. Alternatively or additionally, the actuator 135 may comprise one or more braking mechanisms coupled to the user object to inhibit-movement of the user or the user object 130 in one of more degrees of freedom. By haptic sensation it is meant any sensation provided to the user that is related to the user's sense of touch. For example, the haptic sensation may comprise kinesthetic force feedback and/or tactile feedback. By kinesthetic force feedback it is meant any active or passive force applied to the user to simulate a force that would be experienced in the graphical environment 110, such as a grounded force applied to the user or the user object 130 to simulate a force experienced by at least a portion of the graphical image 115. For example, if the graphical image 115 is positioned against a surface, a barrier or an obstruction, the actuator 135 may output a force against the user object 130 preventing or retarding movement of the user or the user object 130 in the direction of the barrier or obstruction. By tactile feedback it is meant any active or passive force applied to the user to provide the user with a tactile indication of a predetermined occurrence within the graphical environment 110. For example, a vibration, click, pop, or the like may be output to the user when the graphical image 115 interacts with a graphical object 120. Additionally, tactile feedback may comprise a tactile sensation applied to approximate or give the illusion of a kinesthetic force. For example, by varying the frequency and/or the amplitude of an applied vibration, variations in surface textures of different graphical objects can be simulated or by providing a series of clicks when a graphical image penetrates an object, resistance to the penetration can be simulated. For example, in one version a kinesthetic force sensation, such as a spring force, may be applied to the user whenever the graphical image 115 engages the graphical object 120 to simulate a selectively deformable surface. Alternatively or additionally, a tactile sensation, such as a pop, may be applied to the user when the graphical image 115 is moved across a surface of the graphical object 120 to simulate a texture of the graphical object 120.

Figure 2:
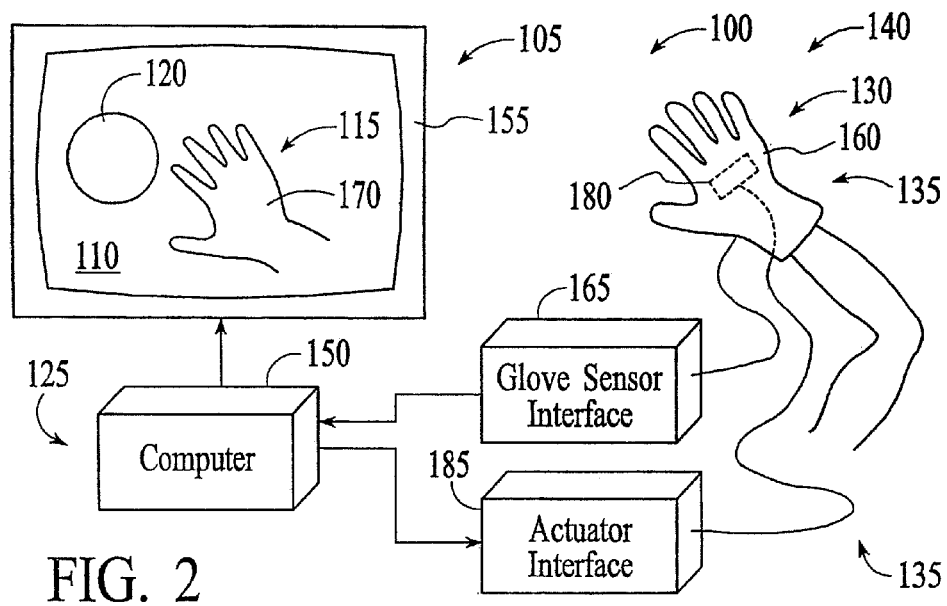
FIG. 2 is a schematic diagram of a simulation system comprising an instrumented glove according to the invention.

The controller 125 may be a computer 150, or the like, such as the computer shown in FIG. 2. In one version, the computer 150 may comprise a processor and may be able to execute program code. For example, the computer may be a personal computer or workstation, such as a PC compatible computer or Macintosh personal computer, or a Sun or Silicon Graphics workstation. The computer 150 may be operable under the Windows™, MacOS, Unix, or MS-DOS operating system or similar. Alternatively, the computer 150 can be one of a variety of home video game console systems commonly connected to a television set or other display, such as systems available from Nintendo, Sega, of Sony. In other embodiments, the computer 150 can be a "set top box" which can be used, for example, to provide interactive television functions to users, or a "network-" or "internet-computer" which allows users to interact with a local or global network using standard connections and protocols such as used for the Internet and World Wide Web. The computer 150 may include a host microprocessor, random access memory (RAM), read only memory (ROM), input/output (I/O) circuitry, and/or other components of computers well-known to those skilled in the art. The computer 150 may implement an application program with which a user is interacting via peripherals, such as haptic interface device 140 and/or user object 130. For example, the application program can be a simulation program, such as an interactive digital mockup of a designed feature, a medical procedure simulation program, a game, etc. Specifically, the application program may be a computer aided design or other graphic design program, an operating system, a video game, a word processor or spreadsheet, a Web page or browser that implements, for example, HTML or VRML instructions, a scientific analysis program, of other application program that may or may not utilize haptic feedback. Herein, for simplicity, operating systems such as Windows™, MS-DOS, MacOS, Linux, Be, etc. are also referred to as "application programs." The application program may comprise an interactive graphical environment, such as a graphical user interface (GUI) to allow the user to input information to the program. Typically, the application provides images to be displayed on a display screen 155 and/or outputs other feedback, such as auditory signals. The computer 150 is capable of generating a graphical environment 110, which can be a graphical user interface, game, simulation, such as those described above, or other visual environment. The computer 150 displays graphical objects 120, such as graphical representations and graphical images, or "computer objects," which are not physical objects, but are logical software unit collections of data and/or procedures that may be displayed as images by the computer on display screen 155, as is well known to those skilled in the art. The application program checks for input signals received from the electronics and sensors of the user object 130, and outputs force values and/or commands to be converted into haptic output for the actuator 135. Suitable software drivers which interface such simulation software with computer input/output (I/O) devices are available from Immersion Corporation of San Jose, Calif. Display screen 155 can be included in the computer and can be a standard display screen (LCD, CRT, flat panel, etc.), 3-D goggles, or any other visual output device.

In one version of the simulation system 100, the user object 130 comprises an instrumented glove 160. Within or on the instrumented glove 160 are one or more sensors that are capable of detecting a manipulation of the glove. A signal indicative of the detected manipulation is provided to the computer 150, optionally through glove sensor interface 165, to control the position, orientation, and/or shape of the graphical image 115, which may be for example a graphical hand 170 as shown in the version of FIG. 2.

The position of the instrumented glove 160 may be used to control the position of the graphical hand 170 in the graphical environment 110. The position of the instrumented glove 160 may be detected by one or more position sensors adapted to detect the position of the instrumented glove 160 in one, two, of three dimensions. The position sensor may include a grounded link connected to the instrumented glove 160. Alternatively, the position sensor may detect the position of the instrumented glove 160 in space, without being physically connected to a reference. For example in one version, the instrumented glove 160 comprises a Polhemus™ or Ascension™ electromagnetic position sensor to detect the three dimensional, position of the instrumented glove 160 in space. The position sensor generates a signal related to the position of the instrumented glove 160 and the signal is provided to the computer 150. The computer 150 then controls the display of the graphical hand 170 in proportion to the signal. In one version, the displayed position of the graphical hand 170 is directly related to the position of the instrumented glove 160.

The orientation of the instrumented glove 160 may alternatively or additionally be used to control the graphical hand 170. An orientation sensor may be provided to detect the absolute or relative rotation of the instrumented glove 160 about one, two, or three orthogonal axes. As with the position sensor, the orientation sensor may be grounded or may be able to detect rotation in space. A signal related to the orientation of the instrumented glove 160 is then provided to the computer 150 which uses the signal to correspondingly control the display of the graphical hand 170. Accordingly, the rotation of the instrumented glove 160 about an axis results in a displayed rotation of the graphical hand 170 about an axis, for example a parallel axis. In one version, a single sensor may be used to detect both position and orientation. For example, a Polhemus™ or Ascension™ sensor may be used to detect the position of the instrumented glove 160 in six degrees of freedom. The computer 150 may then use the six degree of freedom signal to control the displayed position and orientation of the graphical hand 170.

Alternatively or additionally, the shape of the graphical hand 170 (or other graphical image 115) may be controlled by a user manipulating the instrumented glove 160. For example, one or more joint angle sensors may be provided to sense rotation about a particular joint in the hand (or other body part). The computer 150 may then control the display of the graphical hand 160 in relation to the sensed motion within the hand to, for example, show a corresponding movement of the graphical hand 170. In this way, the shape of the graphical hand 170 can be controlled to in response to manipulation of the instrumented glove 160 by the user. For example, a simulation may comprise the display of the graphical hand 170 to simulate the movement of the user's hand, such as by showing the graphical hand 170 closing and/or grasping when the user closes his or her hand or makes a grasping motion. One or more joint angle sensors 175 may be positioned to detect the movement of a finger of the user. In another version, the movement of a plurality of fingers may be detected. In a relatively simple version, a single digital or analog sensor detects either an open condition or a closed condition of the user's hand, and the computer 150 correspondingly displays the graphical hand 170 either as being open or as being closed or grasping an object in the graphical environment 110. In another version, the joint angle position sensor may comprise an analog sensor that provides a variable signal by which the display of the graphical hand 170 may be controlled. The joint angle sensor may comprise one or more of a stain gage, a fiber optic sensor, a potentiometer, or the like.

In one version, the instrumented glove 160 may comprise both a position sensor and one or more joint angle sensors. For example, the instrumented glove 160 may comprise a Cyber-Glove™ available from Virtual Technologies, Inc. in Palo Alto, Calif., and described in U.S. Pat. Nos. 5,047,952 and 5,280,265, both of which are incorporated herein by reference in their entireties. In this version, individual joint angle sensors 175 comprise two long, flexible strain gages mounted back to back. The strain gage assemblies reside in guiding pockets sewn over a particular joint. When the joint is flexed, one of the strain gages of the corresponding pair of gages is in tension, while the other strain gage is in compression. Each pair of two strain gages comprise the two legs of a half bridge of a common Wheatstone bridge configuration. An analog multiplexer is used to select which of the half bridge voltages is to be sampled by an analog-to-digital converter. The maximum strain experienced by each gage is adjusted by varying the thickness and elastic modulus of the backing to which the gages are mounted. The backing is selected to maximize the signal output without significantly reducing the fatigue life of a gage.

In use, a user contacts the user object 130 to interact with the graphical environment 110. In the version shown in FIG. 2, the user dons the instrumented glove 160 and moves all or a portion of his or her hand to control the graphical hand 170 which mimics the motion of the user's hand. For example, the user may move his or her hand to the left in order to cause the graphical hand 170 to be rendered so as to appear to touch the graphical object 120. In additional, the user may slightly close and appropriately move his or her hand to make the graphical hand 170 appear to grasp the graphical object 120.

The realism of the simulation can be increased by providing an actuator 135 adapted to provide one or more haptic sensations to the user during the user's interaction with the graphical environment 110. The actuator may either provide the haptic sensation directly to the user or may apply the haptic sensation to the user through the user object, for example by applying a force to the surface of the instrumented glove 160. This allows the user to not only visualize the graphical hand 170 contacting the graphical object 120, but also to receive an indication through the user's sense of touch that the object has been contacted, thereby providing a more immersive experience. The actuator 135 may comprise a palm forcing mechanism 180 for providing a haptic sensation to the palm of the hand, as shown in phantom in FIG. 2. It has been discovered that by providing a haptic sensation to the palm, the user's perception of realistic interaction with a graphical object 120 is enhanced. For example, a haptic sensation may be provided to the palm in coordination with the graphical hand 160 grasping the graphical object 120 to simulate an actual grasping of an object. Accordingly, in the version of FIG. 2, the computer 150 controls the output of a haptic sensation to the user's palm by providing a signal, optionally though actuator interface 185, to cause the palm forcing mechanism to be actuated.

The actuator 135 may include the palm forcing mechanism 180, and optionally may additionally be able to provide a haptic sensation to other portions of the user and may include additional actuators. In one version, the haptic sensation is delivered essentially only to the palm. It has been discovered that during some simulations, such as a power grasping simulation, a haptic sensation in the palm is perceived by the user as a realistic sensation. Accordingly, by providing an actuator that delivers a haptic sensation to the palm, realistic haptic feedback for many simulations may be provided in an easily implementable and inexpensive version. In other versions, the palm haptic sensations may be combined with haptic sensations delivered to other portions of the user, as will be described below.

Figure 3:
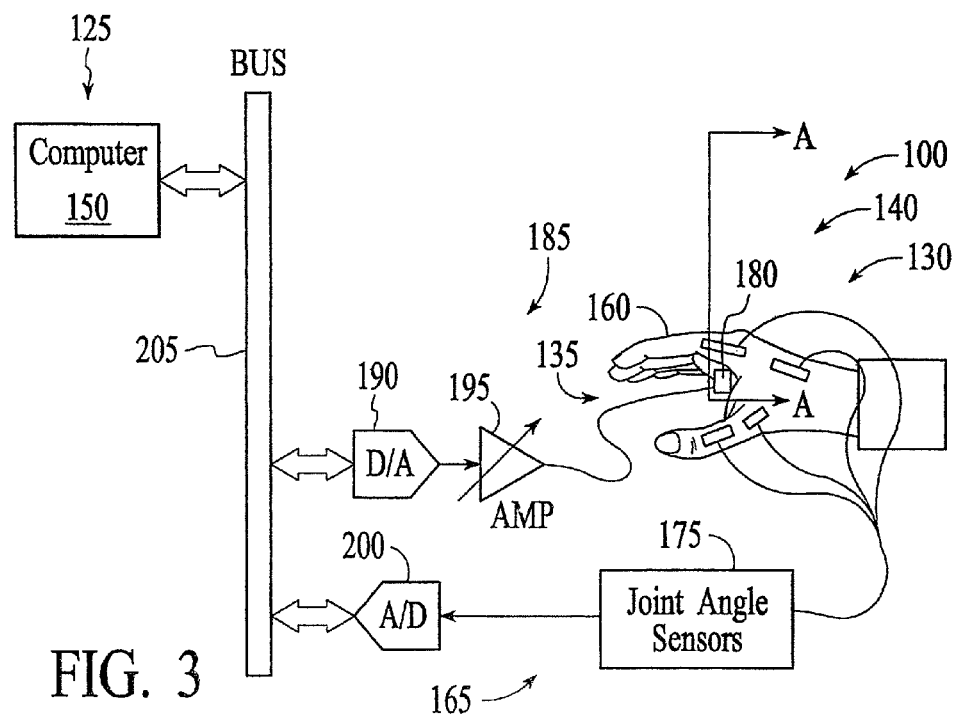
FIG. 3 is a schematic diagram of a simulation system comprising an instrumented glove with joint angle sensors according to the invention.

FIG. 3 shows how the electrical and mechanical signals propagate through an embodiment of the simulation system 100. In this version, an actuating mechanism, such as a DC servo motor causes the palm forcing mechanism 180 to apply a force to the palm. The computer 150, or other controller or signal processor, sends a digital value representing the desired actuation level control signal to the digital-to-analog converter 190. The analog output of the digital-to-analog converter 190 may then be amplified by a variable gain amplifier 195 to produce an analog voltage activation signal. This voltage is placed across the servo motor, driving the motor a desired amount. The voltage signal may alternately be converted to a current activation signal for driving the motor at a desired torque. The joint angle sensors 175 generate an analog signal related to the relative angle of rotation of a joint. The signals from the joint angle sensors 175 are passed through an analog-to-digital converter 200 to provide digitized values to the computer as a physical state signal. In the graphical environment 110, the physical state signal may then cause motion in a corresponding graphical hand 170. If the graphical hand 170 or a portion of the graphical hand 170 contacts a graphical object 120 in a predetermined manner, a haptic sensation is output to the palm of the user. For example, in one version, the computer 150 calculates the force to be applied to the palm using data related to the graphical object's shape and/or compliance. The computer 150 then causes an activation signal to be sent to the palm forcing mechanism to convey haptic information about that virtual force. The computer 150, digital-to-analog converter 190, analog-to-digital converter 200, bus 205 and variable gain amplifier 195 may be elements of a signal processor.

The palm forcing mechanism 180 may be designed to be comfortably positionable in or near the palm of the user. The palm forcing mechanism 180 may be incorporated into the user object 130 or may be a separate mechanism. For example, in one version, the palm forcing mechanism 180 is an independent unit that is adapted to contact the palm of a user. The palm forcing mechanism 180 may either directly contact the palm of the user or may contact the palm through at least a portion of the user object 130. For example, when used with an instrumented glove 160, the palm forcing mechanism 180 may be positioned on the outside of the instrumented glove 160. The palm forcing mechanism 180 may be held in place by a strap that extends around the hand or it may be otherwise attached to the hand, such as by adhesive tape. Alternatively, the palm forcing mechanism 180 may be positioned within the instrumented glove 160. In addition, the palm forcing unit may include a rigid plate secured to the hand that serves as a grounding member against which the palm forcing mechanism 180 can exert a force. In another version, the palm forcing mechanism 180 may be grounded and the user may place his or her hand on or in proximity to the palm forcing mechanism 180 during use.

Figure 4A:
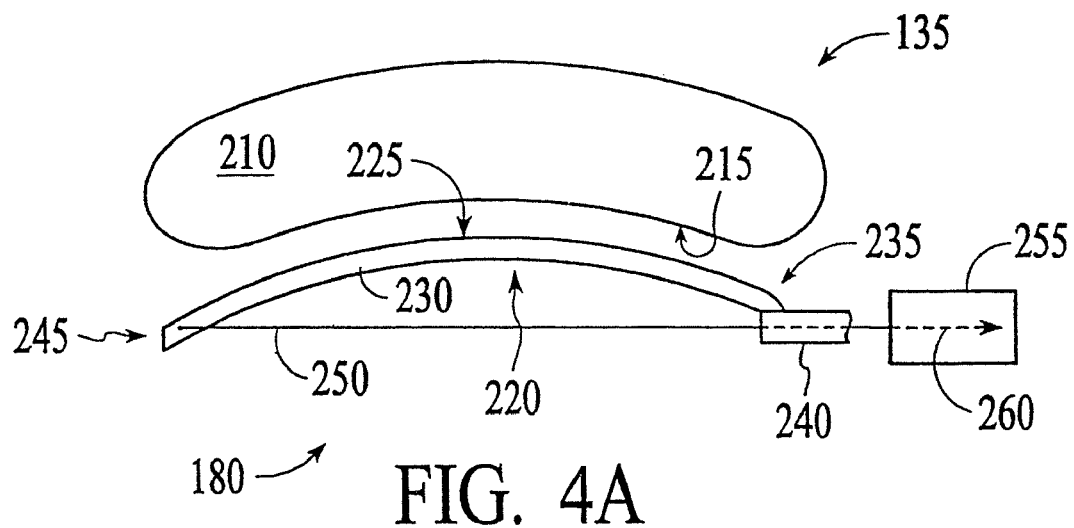
FIGS. 4A through 4C are a schematic side views of the actuation of a palm forcing mechanism according to the invention.

A version of a palm forcing mechanism 180 is shown in FIG. 4A. A user's hand 210 is shown in a cross-section taken along section A-A of FIG. 3 (thumb hot shown), and a palm forcing mechanism 180 is positioned within or near the palm 215 of the user. The palm forcing mechanism 180 comprises a force applying member 220 including a surface 225 that is adapted to contact and/or exert a force against the palm 215 when actuated. In this version, the force applying member 220 comprises a deformable member 230, such as strip of metal, sufficiently stiff to retain a slightly bowed shape, as shown in FIG. 4A. A first end 235 of the deformable member 230 is fixed, for example by being fixed against translation relative to a guide member 240. A second end 245 of the deformable member 230 is connected to a distal end of a tendon 250 which is slidably disposed within the guide member 240. The tendon 250 extends through the guide member 240 and is connected at its proximal end to an actuating mechanism 255. The actuating mechanism 255 is able to exert a pulling force on the tendon 250, that is it is able to exert a force in the direction shown by arrow 260. When the actuating mechanism 250 pulls on the tendon 250, a force is applied to the second end 245 of the deformable member 230 causing the second end 245 to be brought nearer the first end 235, thereby further bowing the deformable member 230.

Figure 4B:
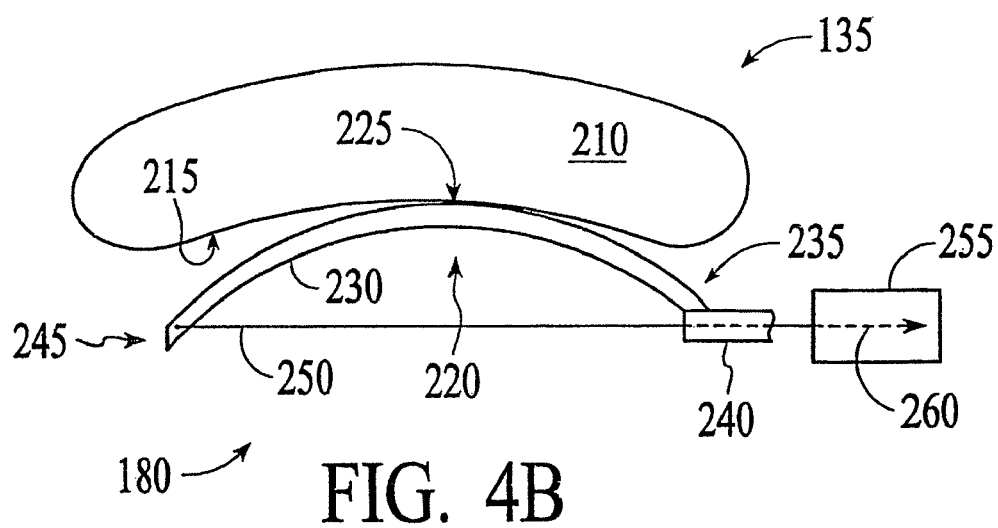
Figure 4C:
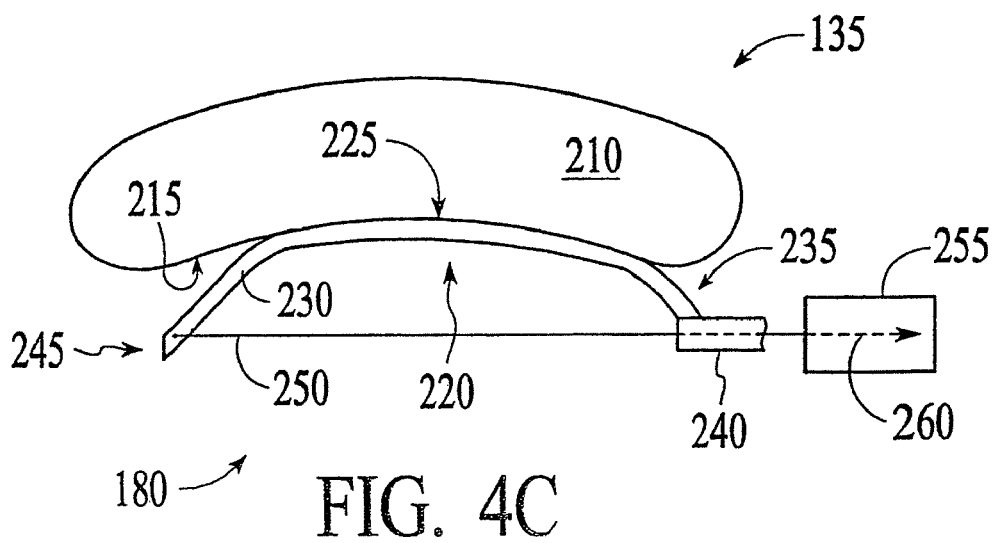

As more force is applied, the deformable member 230 contacts the palm 215, and the user experiences a contact sensation, as shown in FIG. 4B. Thus, when the actuating mechanism 255 is controlled by the computer 150, the application of the contact sensation may be coordinated with a contact event in an ongoing simulation. As a graphical hand 170, for example, grasps a graphical object 120, the user may simultaneously visualize the grasp and feel the sensation in his or her palm by actuation of the palm forcing mechanism 180. Optionally, the actuating mechanism 255 may be capable of continuing to exert a pulling force on the tendon 250, as shown in FIG. 4C, to apply a stronger force on the palm 215. In this way, the simulation system 100 may be able to provide a contact sensation related to the strength of the user's grasping of the graphical object 120 or to simulate a weight or inertia of the graphical object 120.

In one version, the deformable member 230 may comprise a leaf spring that is biased into a configuration substantially as shown FIG. 4A. In this version, the tendon 250 may be a flexible cable or wire, sufficiently rigid in tension to transmit the pulling force from the actuating mechanism 255 to the second end 245 of the deformable member 230 but sufficiently flexible to pass from the first end 235 to the actuating mechanism 255 along a non-linear path. For example, the tendon 250 may comprise Dacron™ or Kevlar™ slidably disposed in one or more fixed tubular casings, as described in U.S. Pat. No. 5,631,861 which is incorporated herein by reference in its entirety. Alternatively, the tendon 250 may comprise metallic material or may be a composite. The bias of the leaf spring is used to return the deformable member 230 to a non-contacting position when the pulling force is removed by the actuating member 255. This simplifies the control process associated with applying a contact sensation. For example, the computer 150 may provide a "pull" signal to drive the actuating mechanism 255 when a contact sensation is desired, and may remove the "pull" signal, resulting in no driving of the actuating mechanism 255 when there is no contact sensation desired, the bias of the spring acting as an active member returning the palm forcing mechanism 180 to the condition of FIG. 4A. In an alternative version, the tendon 250 may be rigid in both tension and compression and the actuating mechanism 255 may drive the tendon 250 in both directions to controllably bow or unbow the deformable member 230.

Figure 5A:
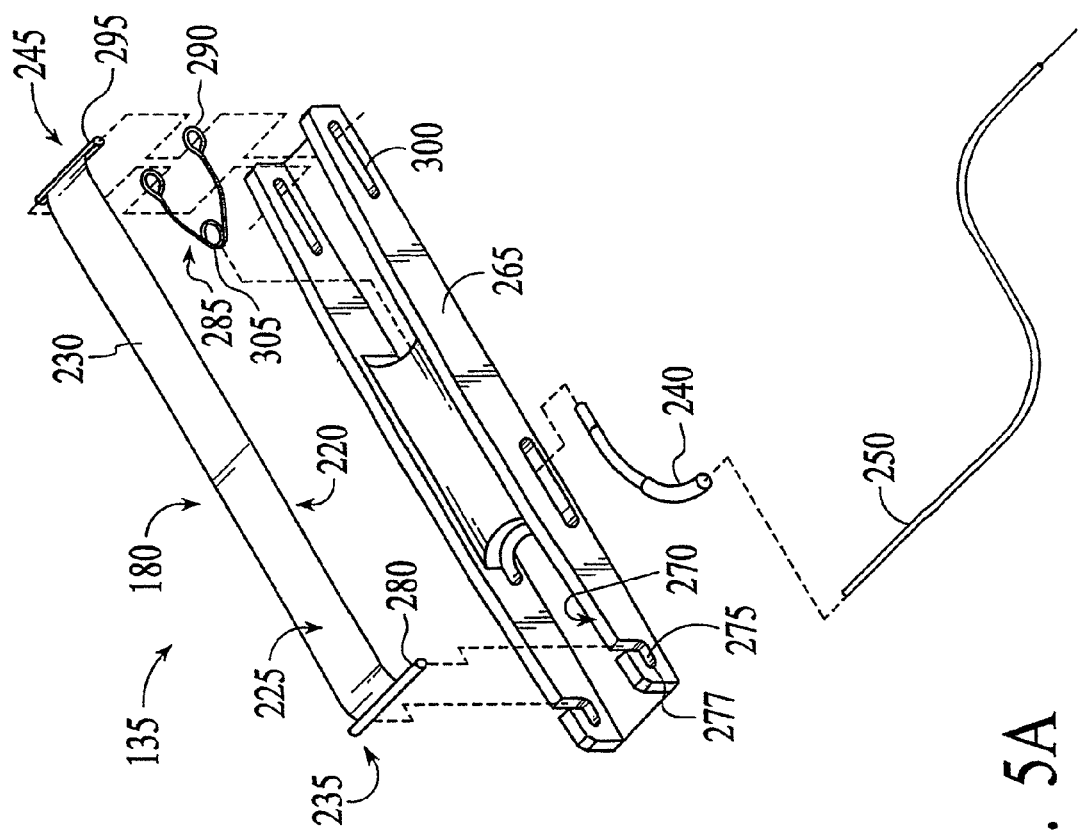
FIGS. 5A and 5B are schematic exploded and assembled views, respectively, of a version of a palm forcing mechanism according to the invention.
Figure 5B:
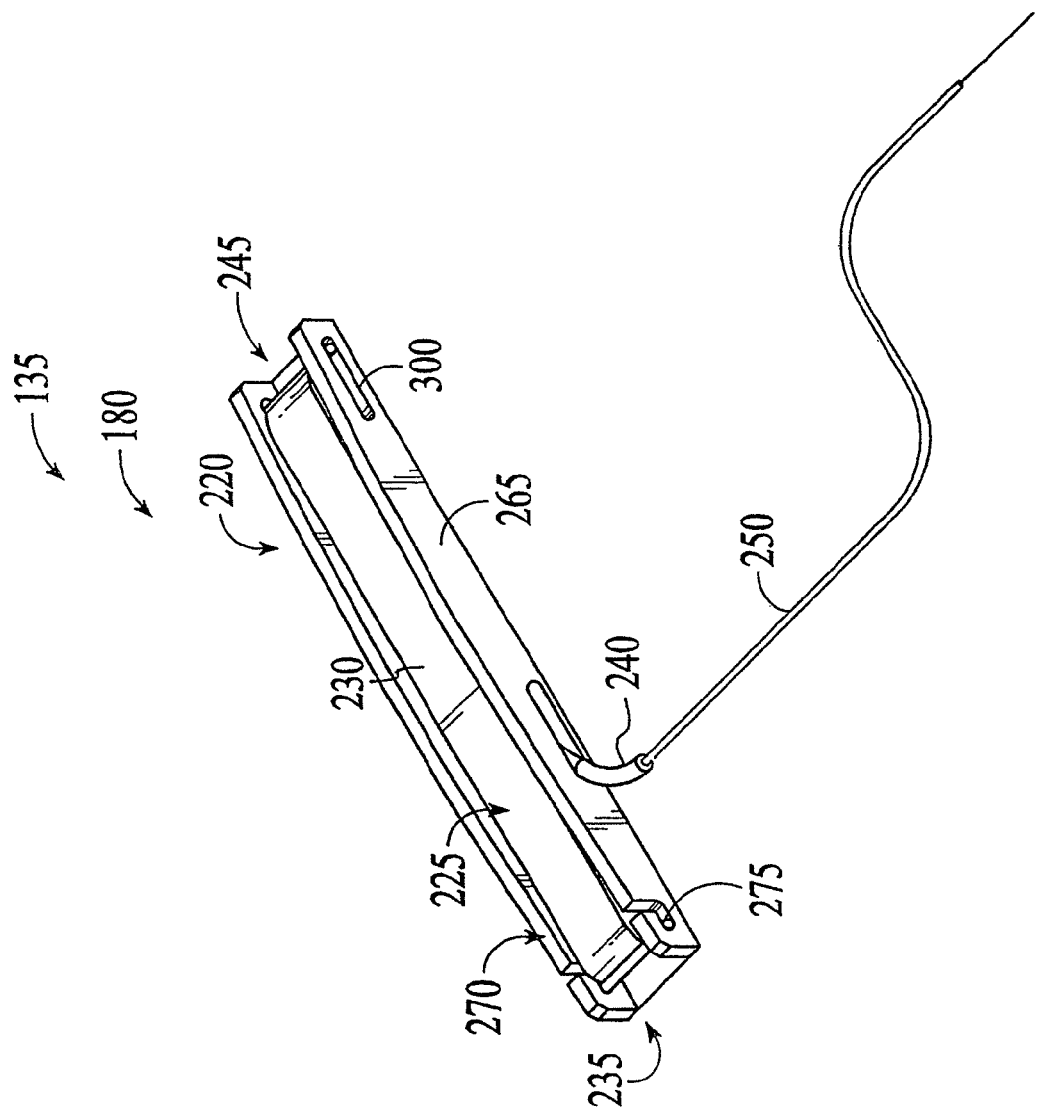

FIGS. 5A and 5B show exploded and assembled views, respectively, of a version of a palm forcing mechanism 180 comprising a biased deformable member 230 and a flexible tendon 250. This version includes a housing 265 which serves to fix the first end 235 of the deformable member 230 to the guide member 240. The housing includes a top surface 270 which is shaped to be positionable adjacent the palm 215 of a user. The top surface 270 may either be spaced from the palm 215 or may rest against the palm 215. It has been discovered that the continuous contact of the top surface 270 against the palm 215 does not affect the user's perception of a contact sensation. The housing 265 may be made of rigid metal, plastic, and/or ceramic material. The housing 265 includes openings 275 in a side wall for receiving prongs 280 extending from the first end 235 of the deformable member 230. The openings 275 include walls 277 that abut against the prongs 280 to limit translation of the deformable member 230 and to allow the deformable member 230 to bow. The prongs 280 may be rotatable within the openings 275 to facilitate the bowing. A connecting member 285 connects the second end 245 of the deformable member 230 to the tendon 250. The connecting member 285 comprises eyelets 290 which are received around extending prongs 295 of the second end 245. The prongs 295 also extend into longitudinally extending slots 300 in the housing 265. Another eyelet 305 is connected to the end of the tendon 250 by suitable means, such as by gluing, soldering, or wrapping the tendon around the eyelet 305. Accordingly, as the tendon 250 is pulled, the connecting member 285 pulls on the prongs 295 which then slide within slot 300. This action causes the deformable member 230 to bow, as discussed above. When the bowing is sufficient to cause the surface 225 of the deformable member 230 to extend above the top surface 270 of the housing 265, a contact sensation is applied to the palm 215.

Figure 6A:
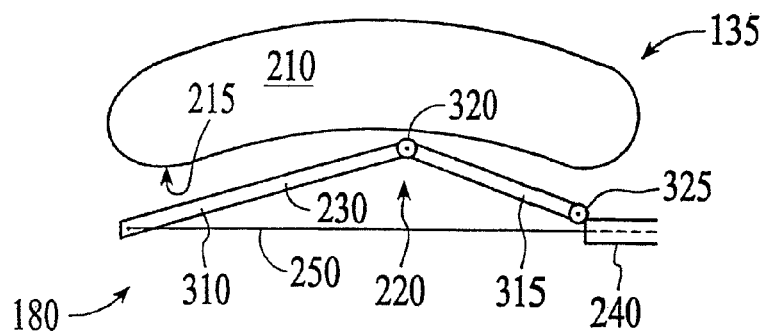
FIGS. 6A through 6H are schematic side views of embodiments of palm forcing mechanisms according to the invention.

Another version of the palm forcing mechanism 180 is shown in FIG. 6A. In this version, the deformable member 230 comprises a pivoted member comprising a first bar 310 and a second bar 315 pivotally connected at a hinge 320. The second bar 315 is also pivotally connected to the guide member 240, or to a housing, for example at a second hinge 325. The tendon 250 is attached to the first bar 310, and as the tendon 250 is pulled, the hinge 320 is forced upwardly and it or another portion of the deformable member 230 contacts the palm 215. In another version, a strap or the like (not shown) and/or a rigid plate is positioned below the distal end of the first bar 310 to inhibit the distal end from being pulled downwardly, thereby increasing the force applied to the palm 215 by the deformable member 230. Alternatively or additionally, a housing similar to the one shown in FIGS. 5A and 5B may provide a base against which the deformable member 230 may be forced toward the palm 215.

Figure 6B:
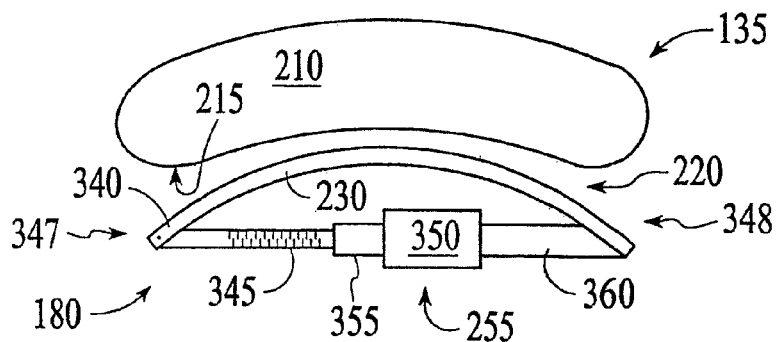

FIG. 6B shows another version of a palm forcing mechanism 180. This version is shown with a deformable strip 340, similar to the leaf spring discussed above, as the deformable member 230 but may be used with pivotally connected bars, such as those shown in FIG. 6A. The version of FIG. 6B includes a motor 350 receiving a rotatably driven shaft 355. The shaft 355 includes interior threads that engage threads on a rod 345 that is connected to an end 347 of the deformable strip 340. As the motor 350 rotates shaft 355 in a first direction, the rod 345 is retracted into the shaft 355 and the end 347 of the deformable strip 340 is moved toward the motor 350. The motor 350 is non-rotatably fixed to the other end 348 of the deformable strip 340, for example by rigid member 360.

Accordingly, movement of the first end 347 toward the motor results in movement of the first end 347 toward the second end 348 and a corresponding bowing of the deformable strip 340. As shown the motor 350 is positioned within the palm forcing mechanism 180. Alternatively, the motor 350 may be located remotely, and the rod 345 may pass through a lumen in the rigid member 360, for example. The actuating mechanism 255 may alternatively be a solenoid or voice coil, or the like.

Figure 6C:
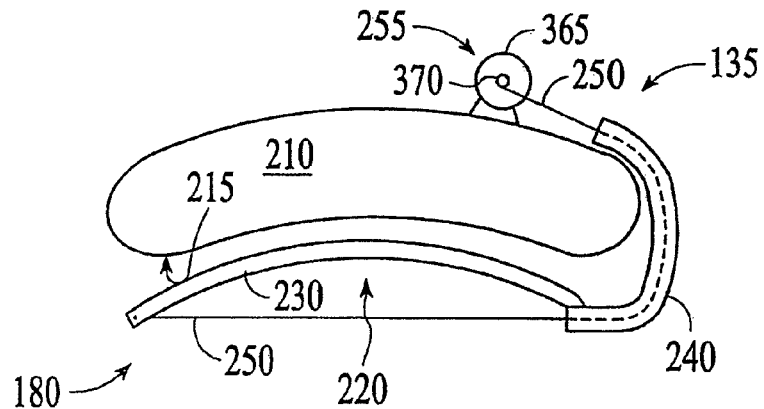

FIG. 6C shows a version of the palm forcing mechanism 180 similar to the version shown in FIG. 4A. However, in the version of FIG. 6C, the actuating mechanism 255 is positioned on the hand of the user; for example by being fixed to the backside of the hand, as shown. This version is advantageous in that the tendon 250 may be contained within the haptic interface device 140 reducing the likelihood of entanglement of the tendon 250 with wires or cables that may be present. FIG. 6C also shows a version of the actuating mechanism comprising a motor 365 which rotatably drives a pulley 370 on which is wound the tendon 250.

Figure 6D:
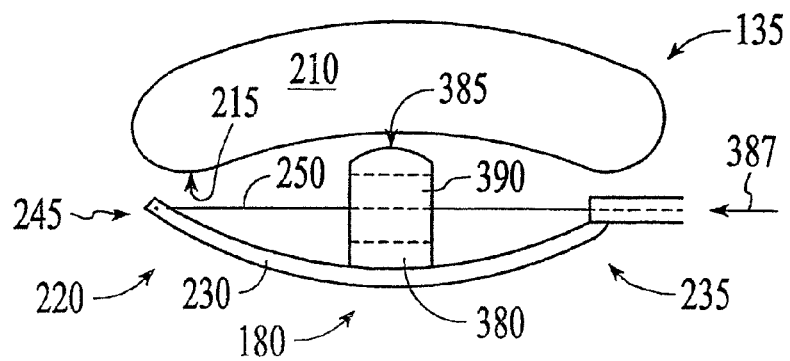

FIG. 6D shows a version of the palm forcing mechanism, 180 where a contact sensation is applied to the palm by pushing on the tendon 250 rather than by pulling on the tendon 250. In this version, the tendon 250 may be sufficiently rigid in compression to adequately apply a force to the palm forcing mechanism 180. In this version, the deformable member 230 is inverted and includes a contact member 380 on its inner surface. The contact member 380 includes a surface 385 adapted to engage the palm 215 when the palm forcing mechanism 180 is actuated. To actuate the palm forcing mechanism 180 the tendon 250 is pushed toward the second end 245 of the deformable member 230 as shown by arrow 387. This forces the second end 245 away from the first end 235 and straightens the deformable member 230 thereby forcing the contact member 380 upward and against the palm 215. An opening 390 may be provided within the contact member 380 to allow the tendon 250 to pass therethrough in all operative positions of the contact member 380. Alternatively, the version of FIG. 6D can be used with a flexible tendon 250. In this version, a the deformable member may be biased so that the ends are biased apart. Tension applied to the tendon 250 overcomes the bias and release of the tension actuates a contact sensation.

Figure 6E:
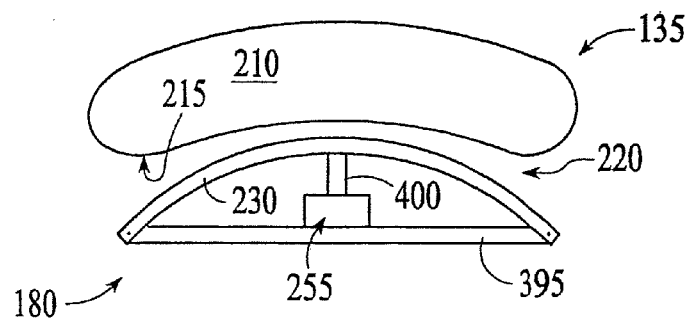

FIG. 6E shows a self-contained version of the palm forcing mechanism 180 with an interior actuating mechanism 255. The actuating mechanism 255 is on a lower member 395 which is held in place by a housing and/or a strap. The actuating member 255 drives a piston 400 upwardly and against the deformable member 230 to force the deformable member against the palm 215. Alternatively, the members may be separated from one another and the actuating mechanism 255 may displace the two members to contact the palm 255. The actuating mechanism may be a solenoid or voice coil actuator or may comprise a rotating threaded shaft that receives a rod attached to the deformable member, as discussed above.

Figure 6F:
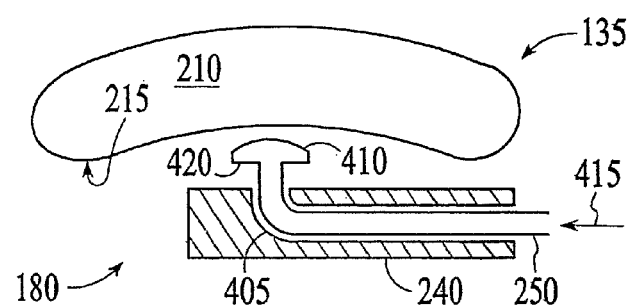

In one version of the palm forcing mechanism 180, the tendon 250 may be used to directly apply the force to the palm 215. For example, the guide member 240, a version of which is shown in cross-section in FIG. 6F, may comprise a channel 405 that is shaped to direct the tendon 250 toward the palm 215. Optionally, the distal end of the tendon 250 may include a force transmitting cap 410 to distribute the force to applied to the palm 215. As a force is applied in the direction of arrow 415, the tendon contacts the palm 215. The cap 410 may include an extension 420 that prevents the cap 410 and the tendon 250 from being retracted into the channel 405.

Figure 6G:
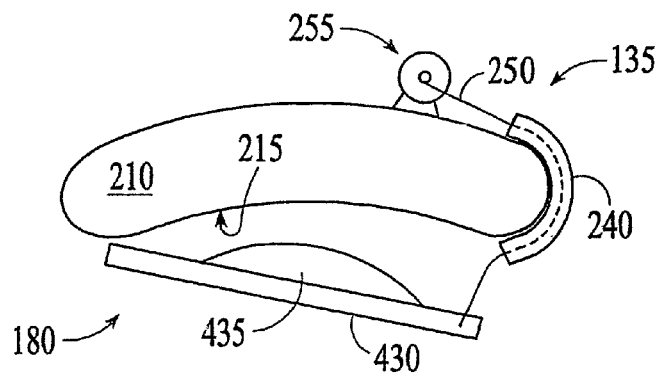

FIG. 6G shows another version of the palm forcing mechanism 180. In this version, a plate 430 is position below the palm 215. The plate includes a contacting portion 435 extending toward the palm 215. The tendon 250 is connected to the plate 430 at an end near the guide member 240. By pulling on the tendon 250 the plate 430 is moved toward the palm 215 and the contacting member 435 applies a force to the palm 215. FIG. 6G shows the actuating mechanism 255 on the backside of the hand. Alternatively, a remote actuating mechanism may be used.

Figure 6H:
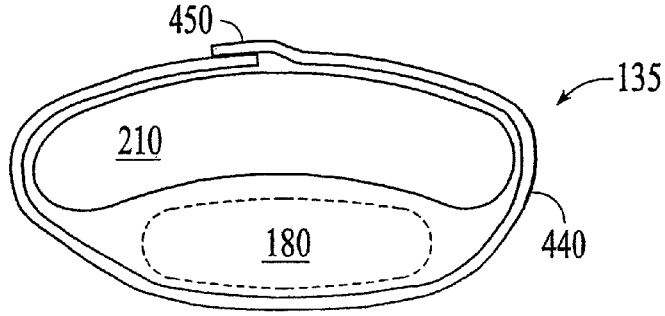

FIG. 6H shows a strap 440 that may be used to secure any of the disclosed palm forcing mechanisms 180 or portions thereof to the hand 210. The strap 440 may extend around the hand and may have ends that are attachable to one another. For example, as shown, the strap ends are attached by a hook and loop type fastener 450. Other suitable attachments may also be used. Alternatively, the ends may be separately fastened to the hand, such as by adhesive, or may be fastened to a plate or the like on the back of the hand 210. The strap 440 may include one or more openings through which elements, such as the tendon 250, the guide member 240, or electronic components, may pass.

The actuator 135 may be designed to reduce its operating space. For example, when applying a force to the palm 215, or to other portions of the body, it may be undesirable to have the force receiving portion of the body burdened with a large actuator 130 that hinders the movement of the user or reduces the realism of the simulation. In one version of the invention, the space requirements of the actuator 135 may be reduced by a mechanism that allows the force applied to the user to be in a different direction than the actuated force. For example, in the embodiments of FIGS. 4A-4C, 5A-5B, 6A-6D, and 6G, the actuators 135 reduce their footprints by providing a force to the user in a direction substantially orthogonal to the direction of the application of an actuating force. This application of a substantially orthogonal force is advantageous in that the space occupied by the actuator 130 may be reduced allowing for the actuating mechanism 255 to be, for example, remotely located and allowing for the tendon 250 to be less obstructively directed away from the portion of the body to which the force is being applied. The other embodiments may also be designed to reduce the amount of position of space they occupy.

Figure 7B:
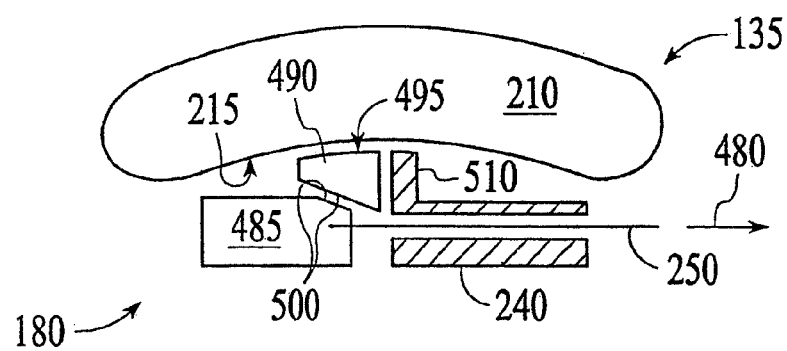
Figure 7C:
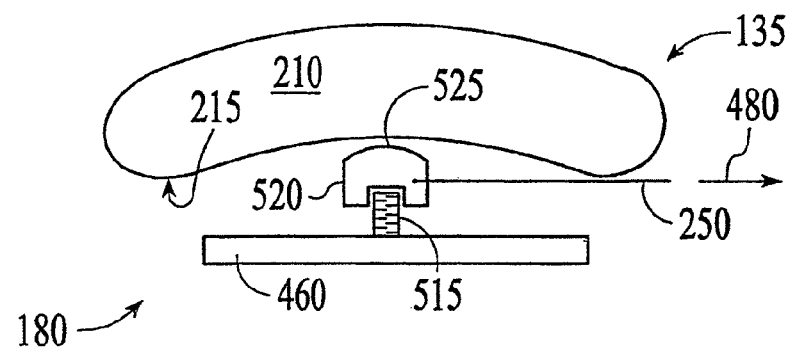
Figure 7D:
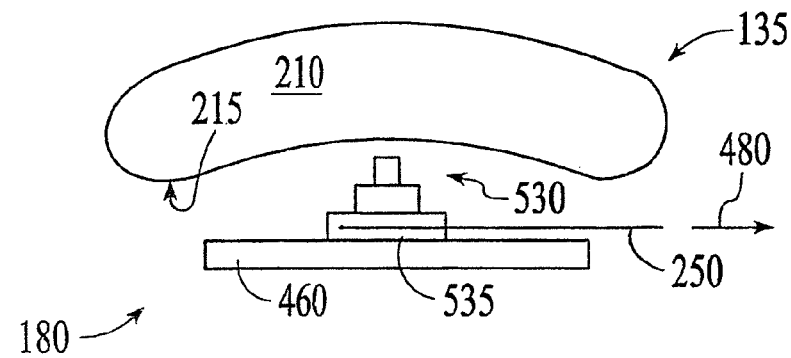

In another version of an actuator 135 that allows for the application of an actuating force in a direction different than, and optionally substantially orthogonal to, the direction of an applied force to the user, a tendon 250 may be used to initiate a cam action that applies a force to the user. Examples of cams are shown in FIGS. 7A though 7D. In the version of FIG. 7A, the palm forcing mechanism 180 comprises a lower member 460 and an upper member 465 which includes a surface 470 adapted to apply a force to the palm 215. Pivotally and eccentrically attached to the lower member 460 is a cam 475. The tendon 250 is attached to the cam 475 so that a force on the tendon 250 in the direction of arrow 480 causes the cam 475 to rotate and separate the lower member 460 from the upper member 465. Since the lower member 460 is grounded, for example by strap 440, the upper member 465 is forced upwardly and the surface 470 applies a contact sensation to the palm 215. A linear cam is shown in the version of FIG. 7B. The tendon 250 is connected to a block than includes a cam surface 500. Above the block 485 is a force applying member 490 that has a lower cam surface 500 and an upper surface 495 for contacting the palm 215. When the block 485 is pulled by the tendon 250 the cam surfaces 500 cause the force applying member 490 to move upwardly and contact the palm 215, the guide member 240 may include an extension 510 to guide the movement of the force applying member 490. In the version of FIG. 7C, the lower member 460 comprises a threaded rod 515. A nut 520 having internal threads is received on the rod 515. The tendon 250 is attached to the outer surface of the nut 520 so that a force in the direction of the arrow 480 causes the nut to rotate about the rod axis, thereby moving the nut 520 upward and applying a force to the palm 215. The force may be applied by a surface 525 on the nut, or an upper member may be attached to the nut 520. Alternatively, the rod and nut may be replaced by a telescoping arrangement 530 where rotation of a pulley 535 results in extension of telescoping members, as shown in FIG. 7D. Alternatively, a turn-buckle type arrangement may be used.

FIG. 8 shows a pneumatic version of the palm forcing mechanism 180. An inflatable air bladder 540 is positioned under the palm 215. A pump 545 or other source of pressurized air is connected to the air bladder 540 by way of a controllable valve 550. In one version, the computer 150 controls the opening and closing of the valve 550 to selectively allow for inflation of the air bladder 540. Alternatively, the computer 150 may control the operation of the pump 545. In one version, the air bladder 540 may include a spring mechanism that biases the air bladder 540 into the deflated position shown in FIG. 8 and the valve 550 may be a one-way valve when in the closed condition so that the force on the palm 215 may be removed when the valve is closed. In another version, one or more openings may be provided in the bladder 540 that allow the escape of air. When the valve is open the volumetric flow rate of the inflow of fluid may be greater than the volumetric flow rate of the escape of fluid to achieve a desired inflation of the air bladder 540.

Any of the above palm forcing mechanism 180 may be modified to apply multipoint contact of the palm 215. For example, FIG. 9 shows a version of the palm forcing mechanism 180 where the deformable member 230 comprises a first portion 555 and a second portion 560 that contact the palm 215 at different locations when the tendon 250 is pulled a sufficient amount. Optionally, the tendon 250 may pass through openings 565 in the portions to increase the stability of the deformable member 230. The multi-point contacting ability can provide a realistic contact sensation to the user when the graphical object 120 to be grasped has a non-continuous surface. In a more advanced version, the two portions may be separately actuated by two separate tendons. This allows for multiple points to be independently contacted by the palm forcing mechanism 180.

The palm forcing mechanism 180 may be used to apply a tactile sensation, such as a vibration, to the palm. For example, in the version shown in FIG. 4A, the actuating mechanism 255 may apply an oscillating or cyclical pulling force on the tendon 250 to vibrate the palm. In one version the force applying member 220 may cyclically contact the palm 215. In another version, the force applying member 220 may be in continuous contact with the palm 215 and the haptic information may be provided through the tactile sensations where the magnitude of the force applied to the palm is varied. Any of the above disclosed embodiments may be vibrated in this manner. Additionally, the palm forcing mechanism 180 may comprises a rotating eccentric mass, as described in U.S. Pat. No. 6,088,017 which is incorporated herein by reference in its entirety.

The actuating mechanism 255 may comprise a servo motor, solenoid, or voice coil as described above or may comprise other actuators known in the art, such as piezoelectric, shape memory alloy, pneumatic, hydraulic, and vapor pressure actuators. Other known electrical, electromagnetic, electromechanical or the like actuators may alternatively or additionally be used.

Any of the above described forcing mechanisms may be adapted to apply a force to a portion of a user's body other than the palm. For example, as shown in FIG. 10, a force applying member 220 may comprise a deformable member 230 actuated by a tendon 250 to apply a haptic sensation to the tip of a finger. A low profile version of the mechanism may be worn under or over an instrumented glove 160 to provide realistic haptic sensations to the user's finger.

The palm forcing mechanism 180 may be used in coordination with other forcing mechanisms. For example, the palm forcing mechanism 180 may be used with a device capable of provide haptic feedback to one or more fingers, as shown in FIG. 11. In this version, the haptic interface 140 comprises a finger forcing mechanism 570 and the palm forcing mechanism 180. The finger forcing mechanism 570 may comprise a tip portion 575 adapted to contact a portion of a user's finger. The tip portion 575 is connected to a tendon 250'. Tendon 250' may be pulled by an actuating mechanism (not shown) to exert a force on the finger. A force-augmenting structure 580 may also be provided to provide more realistic forces to the finger tip. In one particular version, the palm forcing mechanism 180 is used in conjunction with a CyberGrasp™ device available from Virtual Technologies, Inc. and described in U.S. Pat. Nos. 5,631,861 and 6,042,555, both of which are incorporated herein by reference in their entireties. The finger forcing mechanism 570 is worn on the hand and applies computer-controlled force feedback to one or more, preferably each, of the fingers. The haptic interface 140 may be advantageously used to simulate the interaction of the graphical hand 170 and a graphical object 120. An instrumented glove 160 is worn to control the graphical hand 170. The user uses his or her hand to grasp the graphical object 120 with the graphical hand 170. The computer transmits force commands to the actuating mechanisms associated with the finger forcing mechanism 570 so the user may "feel" the graphical object 120 in his or her fingertips. The computer also transmits force commands to the palm forcing mechanism 180 so that the user may also "feel" the graphical object 120 in his or her palm. Thus, both precision grasps, which primarily use the finger tips, and power grasps, where, an object is held against a user's palm, may be simulated. The palm forcing mechanism 180 in this version may be held in place by strap 440 which extends around the hand and is attached to a palm plate used to secure the finger forcing mechanism 570 to the hand. In one version, the palm forcing mechanism 180 and the finger forcing mechanism 570 may use the same force generating and force transmitting system, for example one or more DC motors with spools for respectively winding the tendon 250 and the tendon 250'. The more electrical current that is send to the motors, the more torque is applied to the spools to force the tendons 250, 250'. In another version, the palm forcing mechanism 180 may be used with the CyberTouch™ device available from Virtual Technologies, Inc., and described in U.S. Pat. No. 6,088,017 which is incorporated herein by reference in its entirety. Additionally or alternatively, the palm sensing mechanism 180 may be used with the CyberForce™ device available from Virtual Technologies, Inc. and described in U.S. Pat. Nos. 5,631,861 and 6,042,555 and in U.S. Provisional Patent Application 60/191, 047 filed on Mar. 21, 2000, all of which are incorporated herein by reference in their entireties. In this version, the haptic interface 140 comprises a finger forcing mechanism 570, a palm forcing mechanism 180 and a grounded force applying member attachable to the user at the wrist, for example. The grounded force applying member may be capable of applying forces in from one to six degrees of freedom and may also be capable of detecting movement in from one to six degrees of freedom.

Another version of the simulation system 100 according to the present invention comprises a user object 130 capable of detecting the position of the hand of a user, but that does not have to be worn like a glove. Instead, the user may place his or her hand in contact with the user object 130 in order to interact with the graphical environment 110. For example, as shown in FIG. 12, the user object 130 may comprise a mouse 600 which is manipulatable in at least a planar workspace 605 by a user. This version is convenient and inexpensive to implement while still providing an advantageous virtual reality experience to the user. U.S. Pat. Nos. 6,211,861, 6,100,874, 6,166,723, U.S. patent application Ser. No. 09/585,741 filed on Jun. 2, 2000, and U.S. Provisional Patent Application 60/224,584 filed on Oct. 11, 2000 describe versions of haptic mice and are incorporated herein by reference in their entireties.

The mouse 600 of FIG. 12 adapted to control the graphical image 115 in the graphical environment 110. Ether the entire mouse 600 may serve as the actuatable user object 130 or the housing 615 of the mouse 600 may serve as the actuatable user object 130. As the mouse 600 is manipulated by a user, its position is detected and, the manipulation is communicated to the computer 150 to, for example, control the positioning of the graphical image 115 on a computer screen 155. Mouse 600 is an object that may be grasped or gripped or otherwise contacted by the hand to be manipulated by a user. By grasp in this context it is meant that users may releasably engage a portion of the object in some fashion, such as by hand, with their fingertips, etc. In the described embodiment, mouse 600 is shaped so that a user's fingers or hand may comfortably grasp the object and move it in the provided degrees of freedom in physical space. For example, a user can move mouse 600 to provide planar two-dimensional input to a computer system to correspondingly move the graphical image 115, such as a graphical hand. In addition, mouse 600 may includes one or more buttons 620*a*, 620*b*, 620*c*, 620*d*, 620*e* to allow the user to provide additional commands to the computer 150, as will be described below. Typically, the mouse 600 is a smooth- or angular-shaped compact unit that is designed to fit under a user's hand, fingers, and/or palm, but can also be implemented as a grip, finger cradle, cylinder, sphere, planar object, etc. or may assume the shape or contour of a portion of a person's body.

In the version of FIG. 12, the mouse 600 rests on a ground surface 605 such as a tabletop, mousepad, or a platform. A user grasps the mouse 600 and moves the mouse 600 in a planar workspace on the surface 605 as indicated by arrows 630. Mouse 600 may be moved relative to the ground surface 205, and in one version may be picked up and placed in a different location. In another version, the mouse 600 is linked to the ground surface 205. A frictional ball and roller assembly (not shown in FIG. 12) can in some embodiments be provided on the underside of the mouse 600 to translate the planar motion of the mouse 600 into electrical position signals, which are sent to the computer 150 over a bus 205 as is well known to those skilled in the art. In other embodiments, different mechanisms and/or electronics can be used to convert mouse motion to position or motion signals received by the computer 150, as described below. Mouse 600 may be a relative device, in which its sensor detect a change in position of the mouse, allowing the mouse 600 to be moved over any surface at any location. Alternatively, an absolute mouse may also be used, in which the absolute position of the mouse 600 is known with reference to a particular predefined workspace. The bus 205, which communicates signals between mouse 600 and computer 150 may also provide power to the mouse 600. Components such as actuator 135 may require power that can be supplied from a conventional serial port or through an interface such as a USB or Firewire bus. In other embodiments, signals can be sent between mouse 600 and computer 150 by wireless transmission/reception. In some embodiments, the power for the actuator can be supplemented or solely supplied by a power storage device provided on the mouse 600, such as a capacitor or one or more batteries. Some embodiments of such are disclosed in U.S. Pat. No. 5,691,898, which is incorporated herein by reference in its entirety.

Mouse 600 may include or be acted on by an actuator 135 which is operative to produce forces on the mouse 600 and thereby provide haptic sensations to the user. The mouse 600 may be either a tactile mouse or a kinesthetic force feedback mouse, or both. In one version a tactile mouse comprises, for example, an actuator 135 positioned within the mouse 600 and outputs a force to the housing 215 of the mouse 600. This version is particularly useful in providing tactile sensations, such as vibrations, to the user. In one version, the actuator 135 comprises a grounded link that is connected to the mouse 600 to provide kinesthetic force feedback to the mouse 600 in two or more degrees, of freedom, for example by forcing the mouse 600 in the direction of arrows 230. This version is particularly useful in kinesthetically simulating contours and the feel of objects. Each of these versions will be described herein below.

FIG. 13 is a side cross-sectional view of a version of the mouse 600 of FIG. 12 where the mouse is a tactile mouse 650. Tactile mouse 650 includes one or more actuators 135 for imparting haptic feedback such as tactile sensations to the user of the tactile mouse 650. The actuator 135 outputs forces on the tactile mouse 650 which the user is able to feel. The embodiment of FIG. 13 is intended to provide inertial forces rather than contact forces; contact forces are described with respect to FIG. 14. In some embodiments, two or more actuators 135 can provide inertial forces or contact forces, or one actuator 135 can provide inertial forces, while a different actuator 135 can provide contact forces.

Tactile mouse 650 includes a housing 615, a sensing system 655, and a tactile actuator assembly 660. Housing 615 is shaped to fit the user's hand like a standard mouse while the user moves the tactile mouse 650 in the planar degrees of freedom and manipulates the buttons 620*a*-620*e*. Other housing shapes can be provided in many different embodiments.

Sensing system 655 detects the position of the tactile mouse 650 in its planar degrees of freedom, e.g. along the X and Y axes. In the described embodiment, sensing system 655 includes any one of known sensing technologies. For example, in the version shown, a standard mouse ball 665 for providing directional input to the computer 150. Ball 665 is a sphere that extends partially out the bottom surface of the tactile mouse 650 and rolls in a direction corresponding to the motion of the tactile mouse 650 on a planar surface 605. For example, when the tactile mouse 650 is moved in a direction indicated by arrow 670 (y direction), the ball rotates in place in a direction shown by arrow 675. The ball motion can be tracked by a cylindrical roller 680, or the like, which is coupled to a sensor 685 for detecting the motion of the mouse 600. A similar roller and sensor can be used for the x-direction which is perpendicular to the y-axis. Other types of mechanisms and/or electronics for detecting planar motion of the tactile mouse 650 can be used in other embodiments. In some embodiments, high frequency tactile sensations can be applied by the actuator that cause a mouse ball 665 to slip with respect to the frictionally engaged rollers. In another version, an optical sensor that has no moving mouse ball component may be used. A suitable optical mouse technology is made by Agilent of Palo Alto, Calif. and can be advantageously combined with the tactile sensation technologies described herein, where the optical sensor detects motion of the mouse relative to the planar support surface by optically taking and storing a number of images of the surface and comparing those images over time to determine if the mouse has moved. For example, the IFeel™ mouse device from Logitech Corporation uses this type of sensor.

Buttons 620a-620e can be selected by the user as a "command gesture" when the user wishes to input a command signal to the computer 150. The user pushes a button 620 down (in the degree of freedom of the button approximately along axis z) to provide a command to the computer 150. The command signal, when received by the computer 150, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of one or more of the buttons 620a-620e in its range of motion (degree of freedom). In some embodiments, one or more of the buttons 620a-620e can be provided with force feedback (instead of or in addition to the tactile feedback from actuator 135), as described in copending U.S. patent application Ser. No. 09/235,132, filed on Feb. 18, 1999 and which is incorporated herein by reference in its entirety. In one version, the buttons 620 may be used to control the shape of a graphical image 115, such as a graphical hand 170, as will be described below.

The tactile actuator assembly 660 may include an actuator assembly including an actuating mechanism 690, such as a motor, a flexure mechanism ("flexure") 695, and an inertial mass 700 coupled to the actuating mechanism 690 by the flexure 695. The inertial mass 700 is moved in a linear direction by the actuating mechanism 690, for example approximately in the z-axis 705 which is approximately perpendicular the planar workspace of the mouse 600 in the x- and y-axes, e.g. the mouse's position or motion is sensed in the x-y plane. The tactile actuator 660 is coupled to the housing 615 of the tactile mouse 650 such that inertial forces caused by the motion of the inertial mass 700 are applied to the housing 615 of the tactile mouse 650 with respect to the inertial mass, thereby conveying haptic feedback such as tactile sensations to the user of the tactile mouse 650 who is contacting the housing 615. Thus, the actuating mechanism 690 need not directly output forces to the user or to a user-manipulatable object, but instead the moving mass creates an inertial force that is indirectly transmitted to the user. Thus, the inertial mass is used as a grounding reference for tactile sensations, and the housing 615 may serve as a palm forcing mechanism 180. Alternatively, the actuating mechanism 690 may directly apply the forces or may be coupled to a rotating eccentric mass.

One version of the tactile mouse 650 provides linear output forces using a rotary actuator, i.e. an actuator outputting a rotary force (torque). In the current actuator market, rotary actuators such as rotary DC motors are among the most inexpensive types of actuators that still allow, high bandwidth operation (when driven with signals through, for example, an H-bridge type amplifier). These types of motors can also be made very small and output high magnitude forces for their size. Thus, actuating mechanism 690 may be a DC motor, but can be other types of rotary actuators in other embodiments. For example, a moving magnet actuator can be used instead of a DC motor; such an actuator is described in detail in copending patent application No. 60/133,208, incorporated herein by reference. Other types of actuators can also be used, such as a stepper motor controlled with pulse width modulation of an applied voltage, a pneumatic/hydraulic actuator, a torquer (motor with limited angular range), shape memory alloy material (wire, plate, etc.), a piezo-electric actuator, etc. The tactile mouse 650 in the version shown in FIG. 13 makes use of low cost flexure as a mechanical transmission to convert a rotary actuator force to a linear force that is used to move the inertial mass, and to also amplify the forces to allow more compelling haptic sensations. Versions of the flexure are described in U.S. patent application Ser. No. 09/585,741. In the described embodiment of FIG. 13, tactile actuator 660 has a stationary portion which is coupled to a part of the housing 615 (and thus stationary only with respect to the portion of the mouse housing to which it is coupled), for example by being coupled to bottom portion 710 of the housing 615. A rotating shaft of the actuating mechanism 690 is coupled to the moving portion of the assembly that includes the inertial mass 700 and at least part of the flexure 695, where the inertial mass moves linearly approximately along the Z-axis. The actuating mechanism 690 is operative to oscillate the inertial mass 700 (or itself in some embodiments) quickly along an axis which is approximately parallel to the Z axis. Thus, forces produced by the oscillation of the inertial mass 700 are transmitted to the housing 615 through the tactile actuator 660 and felt by the user.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in U.S. Pat. No. 6,020,876 which is incorporated herein by reference in its entirety. The x and y directed tactile sensations may also provide advantageous and authentic virtual reality related tactile sensations.

One way to direct an inertial force is to directly output a linear force, e.g., a linear moving voice coil actuator or a linear moving-magnet actuator can be used, which are suitable for high bandwidth actuation. These embodiments are described in greater detail in U.S. Pat. No. 6,211,861 which is incorporated herein by reference in its entirety. These embodiments allow for high fidelity control of force sensations in both the frequency and magnitude domains, and also allow the forces to be directed along a desired axis and allows for crisp tactile sensations that can be independently modulated in magnitude and frequency.

FIG. 14 is a side elevational view of another version of a tactile mouse 650'. In this version, the linear motion provided by the tactile actuator 660 is used to drive a portion of the housing 615 (or other member) that is in direct contact with the user's hand (finger, palm, etc.). The tactile actuator 660 of this version includes an actuating mechanism 690, flexure 695, and inertial mass similar to the version of FIG. 13 (except that the actuating mechanism and flexure of FIG. 14 are shown rotated approximately 90 degrees with respect to FIG. 13). The tactile mouse 650' of FIG. 14 includes a moving cover portion 720 which can be part of the housing 615. Cover portion 720 is coupled to the rest of the housing 615 by a hinge allowing their respective motion, such as a mechanical hinge, a flexure, rubber bellows, or other type of hinge. Cover portion 720 may thus rotate about an axis B of the hinge. In other embodiments, the hinge can allow linear of sliding motion rather than rotary motion between cover and housing portions. In the embodiment shown, the cover portion 720 extends in the y-direction from about the mid-point of the mouse housing to near the back end of the tactile mouse 650'. In other embodiments, the cover portion 720 can cover larger or smaller areas. Various embodiments of such a moveable cover portion are described in copending patent application Ser. No. 09/253,132 which is incorporated herein by reference in its entirety. The cover portion 720 is rotatably coupled to a link 725, and the link 725 is rotatably coupled at its other end to the linear moving portion the flexure 695. Thus, as the member of the flexure 695 is moved along the z-axis, this motion is transmitted to the cover portion 720 through the link 725, where the rotational couplings of the link allow the cover portion 720 to move about axis B of the binge. The actuating mechanism 690 can drive the flexure 695 up on the z-axis, which causes the cover portion 720 to move up to, for example, the dashed position shown.

The user feels the force of the cover portion 720 against his or her hand (such as the palm) as a contact force (as opposed to an inertial force). When the cover portion is oscillated, the user can feel a vibration-like force. Accordingly, the cover portion 720 may be used as a palm forcing mechanism 180 to simulate a contact sensation at the palm. The cover portion can also be used to designate 3-D elevations in a graphical environment. In some embodiments, the configuration described can inherently provide an inertial force as well as the contact force if an inertial mass is moved as described above in addition to the contact portion. In other embodiments, a different "contact member" (e.g. a member that is physically contacted by the user) can be moved instead of the cover portion 320 but in a similar fashion, such as one or more of the mouse buttons 620a-620e or other buttons, tabs, mouse wheels, or dials. Furthermore, in some embodiments multiple actuator assemblies can be used to drive a cover portion and one or more buttons 620a-620e or other controls of the tactile mouse 250'. Furthermore, in some embodiments, one actuator assembly can be used to move a cover portion 720 or other member, and a different actuator assembly can be used to provide an inertial force as in the embodiment of FIG. 13, where the inertial and contact forces can operate in conjunction if desired.

FIG. 15 is a block diagram illustrating one embodiment of the simulation system 100 where the controller 125 may comprise a computer 150 and the haptic interface device 140 may comprise a tactile mouse 650, such as one of the tactile mice discussed above. In this version, the tactile mouse 650 comprises a local microprocessor 750. However, the invention may be implemented with higher level control.

The computer 150 may include a processor 755, such as a microprocessor, a clock 760, a display screen 155, and an audio output device 765. The computer 150 may also include other well known components, such as random access memory (RAM), read-only memory (ROM), and input/output (I/O) electronics (not shown). Display screen 155 displays images of a simulation, game environment, operating system application, etc. Audio output device 765, such as speakers, is preferably coupled to host microprocessor 755 via amplifiers, filters, and other circuitry well known to those skilled in the art and provides sound output to user when an "audio event" occurs during the implementation of an application program. Other types of peripherals can also be coupled to host processor 755, such as storage devices (hard disk drive, CD ROM drive, floppy disk drive, etc.), printers, and other input and output devices.

The haptic interface device 140, such as a tactile mouse 250, is coupled to the computer 150 by a bi-directional bus 205. The bi-directional bus 205 sends signals in either direction between the computer 150 and the interface device 140. Bus 205 can be a serial interface bus, such as an RS232 serial interface, RS-422, Universal Serial Bus (USB), MIDI, or other protocols well known to those skilled in the art, or a parallel bus or wireless link. For example, the USB standard provides a relatively high speed interface that can also provide power to the actuator 135.

The haptic interface device 140, such as the tactile mouse 250 can include a local controller, such as a local microprocessor 750. Local microprocessor 750 can optionally be included within the housing 615 of the tactile mouse 650 to allow efficient communication with other components of the tactile mouse 650. By local it is meant that the processor 750 is a separate processor from any processors in the computer 150. The local microprocessor 750 may be dedicated to haptic feedback and sensor I/O of the tactile mouse 650. Local microprocessor 750 can be provided with software instructions to wait for commands or requests from the computer 150, decode the command or request, and handle/control input and output signals according to the command or request. In addition, local processor 750 can operate independently of the computer 150 by reading sensor signals and calculating appropriate forces from those sensor signals, time signals, and stored or relayed instructions selected in accordance with a host command. Suitable microprocessors for use as local microprocessor 750 include the MC68HC711E9 by Motorola, the PIC16C74 by Microchip, and the 82930AX by Intel Corp., for example, as well as more sophisticated force feedback processors such as the Immersion Touchsense Processor, available from Immersion Corporation in San Jose, Calif. Local microprocessor 750 can include one microprocessor chip, multiple processors and/or co-processor chips, and/or digital signal processor (DSP) capability.

Local microprocessor 750 can receive signals from sensor(s) 770 and provide signals to tactile actuator 660 in accordance with instructions provided by the computer 150 over bus 205. For example, in a local control embodiment, the computer 150 provides high level supervisory commands to local microprocessor 750 over bus 205, and local microprocessor 750 decodes the commands and manages low level force control loops to sensors 770 and the tactile actuator 660 in accordance with the high level commands and independently of the computer 150. This operation is described in greater detail in U.S. Pat. Nos. 5,739,811 and 5,734,373, both incorporated by reference herein in their entireties. In the computer control loop, force commands are output from the computer 150 to local microprocessor 750 and instruct the local microprocessor 750 to output a force or force sensation having specified characteristics. The local microprocessor 750 reports data to the computer 150, such as locative data that describes the position of the tactile mouse 650 in one or more provided degrees of freedom. The data can also describe the states of buttons 620a-620e and a safety switch 775. The computer 150 uses the data to update executed programs. In the local control loop, actuator signals are provided from the microprocessor 750 to tactile actuator 660 and sensor signals are provided from the sensor 770 and other input devices 780 to the local microprocessor 750. The haptic sensation or tactile sensation may be either a single force or a sequence of forces output by the tactile actuator 660 which provide a sensation to the user. For example, vibrations, a single jolt or pulse, or a texture sensation are all considered haptic or tactile sensations. The local microprocessor 750 can process inputted sensor signals to determine appropriate output actuator signals by following stored instructions. The microprocessor 750 may use sensor signals in the local determination of forces to be output on the housing 615, as well as reporting locative data derived from the sensor signals to the host computer.

In yet other embodiments, other simpler hardware can be provided locally to tactile mouse 650 to provide functionality similar to microprocessor 750. For example, a hardware state machine incorporating fixed logic can be used to provide signals to the tactile actuator 660 and receive sensor signals from sensors 770, and to output tactile signals according to a predefined sequence, algorithm, or process. Techniques for implementing logic with desired functions in hardware are well known to those skilled in the art.

In a different, host-controlled embodiment, the computer 150 can provide low-level force commands over bus 205, which are directly transmitted to the tactile actuator 660 via local microprocessor 750 or other (e.g. simpler) circuitry. The computer 150 thus directly controls and processes all signals to and from the tactile mouse 650, e.g. the computer 150 directly controls the forces output by tactile actuator 660 and directly receives sensor signals from sensor 770 and input devices 780. This embodiment may be desirable to reduce the cost of the haptic feedback device yet further, since no local microprocessor 750 or other processing circuitry need be included in the tactile mouse 650. In another simple host control embodiment, the signal from the host to the device can be a single bit that indicates whether to actuate the actuator at a predefined frequency and magnitude. In a more complex embodiment, the signal from the host could include a magnitude, giving the strength of the desired actuation. In yet a more complex embodiment, the signal can include a direction, giving both a magnitude and a sense for the actuation. In still a more complex embodiment, a local processor can be used, to receive a simple command from the host that indicates a desired force value to apply over time. The microprocessor then outputs the force value for the specified time period based oh the one command, thereby reducing the communication load that must pass between host and device. In an even more complex embodiment, a high-level command with tactile sensation parameters can be passed to the local processor 750 on the device which can then apply the full sensation independent of host intervention. Such an embodiment allows for the greatest reduction of communication load. Alternatively, a combination of numerous methods described above can be used for a single tactile mouse 650.

Local memory 780, such as RAM and/or ROM, is preferably coupled to microprocessor 750 in tactile mouse 650 to store instructions for microprocessor 750 and store temporary and other data. For example, force profiles can be stored in memory 780, such as a sequence of stored force values that can be output by the microprocessor, or a look-up table of force values to be output based on the current position of the tactile mouse 650. In addition, a local clock 785 can be coupled to the microprocessor 750 to provide timing data, similar to the system clock of the computer 150; the timing data might be required, for example, to compute forces output by tactile actuator 660 (e.g., forces dependent on calculated velocities or other time dependent factors). In embodiments using the USB communication interface, timing data for microprocessor 750 can be alternatively retrieved from the USB signal. For example, the computer 150 can send a "spatial representation" to the local microprocessor 750, which is data describing the locations of some or all the graphical objects 120 displayed in a graphical environment 110 which are associated with forces and the types/characteristics of these graphical objects 120. The microprocessor 750 can store such a spatial representation in local memory 780, and thus will be able to determine interactions between the user object and graphical objects 120 independently of the computer 150. In addition, the microprocessor 750 can be provided with the necessary instructions or data to check sensor readings, determine graphical image 115 positions, and determine output forces independently of the computer 150. The computer 150 could implement program functions (such as displaying images) when appropriate, and synchronization commands can be communicated between the microprocessor and the computer 150 to correlate the microprocessor and host processes. Also, the local memory 780 can store predetermined force sensations for the microprocessor that are to be associated with particular types of graphical objects. Alternatively, the computer 150 can directly send force feedback signals to the tactile mouse 650 to generate tactile sensations.

Sensors 770 sense the position or motion of the mouse (e.g. the housing 615) in its planar degrees of freedom and provides signals to microprocessor 750 (or to computer 150) including information representative of the position or motion. Sensors suitable for detecting planar motion of a tactile mouse include the sensing system 655 described above for FIG. 13, e.g. digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 790 can be used to convert sensor signals to signals that can be interpreted by the microprocessor 750 and/or computer 150, as is well known to those skilled in the art.

Tactile actuator 660 transmits forces to the housing 615 of the tactile mouse 650 as described above with reference to FIGS. 13 and 14 in response to signals received from microprocessor 750 and/or computer 150. Tactile actuator 660 is provided to generate inertial forces by moving an inertial mass, and/or contact forces by moving a contact member such as a cover portion 720. The tactile actuator 660 has the ability to apply a short duration force on the housing 615 of the mouse with respect to an inertial mass. In one version, this short duration is directed substantially along a Z axis orthogonal to the X-Y plane of motion of the tactile mouse 650. The short duration force may be a single burst of fixed magnitude and duration or may be controllable and/or shapeable. In one version, a periodic force can be applied to the housing of the tactile mouse 650 with respect to the inertial mass, where the periodic force can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613 which is incorporated herein by reference in its entirety. There are two ways the period sensations can be communicated from the host to the device. The wave forms can be "streamed" as described in U.S. Pat. No. 5,959,613 and pending provisional patent application 60/160,401, both incorporated herein by reference in their entireties. Or the waveforms can be conveyed through high level commands that include parameters such as magnitude, frequency, and duration, as described in U.S. Pat. No. 5,734,373 which is incorporated herein by reference in its entirety. These control schemes can also apply when providing contact forces using a moveable member. A short duration force command signal can also be used in those embodiments outputting both inertial and contact forces to move both the inertial mass and the contact member to provide simultaneous pulse sensations; or, the inertial mass can be controlled to output one sensation and the contact member can be simultaneously controlled to output a different sensation, such as a force of a different duration or magnitude, a vibration of a different frequency, a texture of a different spacing, etc.

Alternate embodiments can employ additional actuators for providing haptic sensations in the z-direction and/or in the degrees of freedom of the tactile mouse 650. In one embodiment, the tactile mouse 650 can include multiple tactile actuators for greater magnitude forces, forces in multiple degrees of freedom, and/or different simultaneous haptic sensations. In another embodiment, the tactile mouse 650 can be enhanced with a secondary, different type of actuator in addition the actuator assembly described herein. Because of power constraints in some embodiments, this secondary actuator can be passive (i.e., it dissipates energy). The passive actuator can be a brake, e.g., a brake employing a very low power substrate such as a magneto-rheological fluid. Alternatively, it can be a more traditional magnetic brake. The passive braking means can be employed through a frictional coupling between the mouse housing 615 and the table surface 605. For example, a friction roller in the mouse housing base can engage the table surface. The roller can spin freely when the mouse is moved by the user so long as the passive brake is not engaged. When the brake is engaged, the user can feel the passive resistance to motion of the mouse (in one or two of the planar degrees of freedom of the mouse).

Actuator interface 795 can be optionally connected between tactile actuator 660 and local microprocessor 750 to convert signals from microprocessor 750 into signals appropriate to drive tactile actuator 660. Actuator interface 795 can include power amplifiers, switches, digital to analog controllers (DACs), analog to digital controllers (ADCs), and other components, as is well known to those skilled in the art. It should be noted that circuitry should be provided to allow the actuator to be driven in two directions, since the preferred embodiment does not allow full revolutions of the actuator shaft, as described above. Circuitry for such bi-directional (harmonic) operation are well known to those skilled in the art and are also described in copending provisional patent application No. 60/142,155, incorporated herein by reference in its entirety.

Other input devices 780 may be included in the tactile mouse 650 and send input signals to microprocessor 750 of to the computer 150 when manipulated by the user. Such input devices include buttons 620a-620e and can include additional buttons, dials, switches, scroll wheels, or other controls or mechanisms.

Power supply 797 can optionally be included in tactile mouse 650 coupled to actuator interface 795 and/or tactile actuator 660 to provide electrical power to the actuator, or may be provided as a separate component. Alternatively, and more preferably when possible, power can be drawn from a power supply separate from the tactile mouse 650, or power can be received across a USB or other bus. Also, received power can be stored and regulated by tactile mouse 650 and thus used when needed to drive tactile actuator 660 or used in a supplementary fashion. Because of the limited power supply capabilities of USB, a power storage device may be required in the mouse device to ensure that peak forces can be applied (as described in U.S. Pat. No. 5,929,607, incorporated herein by reference in its entirety). For example, power can be stored over time in a capacitor or battery and then immediately dissipated to provide a jolt sensation to the mouse. Alternatively, this technology can be employed in a wireless mouse, in which case battery power is used to drive the tactile actuator 660. In one embodiment, the battery can be charged by an electric generator on board the mouse, the generator driven by the user's motions of the mouse device. For example, a mouse ball or cylinder can turn a frictional roller or shaft that is coupled to and recharges the generator.

A safety switch 775 can optionally be included to allow a user to deactivate tactile actuator 660 for safety reasons. For example, the user must continually activate or close safety switch 775 during operation of tactile mouse 650 to enable the tactile actuator 660. If, at any time, the safety switch is deactivated (opened), power from power supply 797 is cut to tactile actuator 660 (or the actuator is otherwise disabled) as long as the safety switch is needed. Embodiments include an optical switch, an electrostatic contact switch, a button or trigger, a hand weight safety switch, etc.

A number of tactile sensations can be output by the tactile mouse 650. A basic tactile functionality desired for the tactile mouse 650 is a jolt sensation. A jolt sensation may be output when the graphical image 115 is moved to a position where it intersects the graphical object 120 of moved to a position where is lies within or near a predetermined region of the graphical object 120. The appropriate sensation for this simple interaction is a quick, abrupt pop. This can be achieved by applying a crisp, short force between the inertial mass and the housing of the mouse device, e.g. by moving the inertial mass in one or a small number of oscillations. For example, a jolt can include a single impulse of force that quickly rises to a desired magnitude and then is turned off or quickly decays back to zero or small magnitude. The pulse can also or alternatively be output as a motion up and down of a contact member such as a cover portion of the housing of the mouse, in appropriate embodiments. A vibration can also be output, which can include a series of jolts or pops applied periodically over a particular time period at a particular frequency. The time-varying force can be output according to a force vs. time waveform that is shaped like a sine wave, triangle wave, sawtooth wave, or other shape of wave. The vibration is caused by a mass or contact member oscillating back and forth. In some embodiments, the sensation of a "spatial texture" may be output by correlating jolts and/or vibrations with the motion of the cursor over a graphical object or area. This type of force can depend on the position of the tactile mouse 650 in its planar workspace (or on the position of the graphical image 115 in the graphical environment 110). For example, the graphical image 115 can be dragged over a graphical grating and jolts can be correlated with the spacing of the grating openings. Thus, texture bumps are output depending on whether the graphical image 115 has moved over the location of a bump in a graphical object; when the mouse is positioned between "bumps" of the texture, no force is output, and when the mouse moves over a bump, a force is output. This can be achieved by host control (e.g., the host computer 150 sends the jolts as the graphical image 115 is dragged over the grating) or by local control (e.g., the host computer 150 sends a high level command with texture parameters and the sensation is directly controlled by the tactile mouse 250 device). Some methods for providing texture sensations in a tactile sensation device are described in copending application Ser. No. 09/504,201, filed Feb. 15, 1960 and incorporated herein by reference in its entirety. In other cases, a texture can be performed by presenting a vibration to a user, the vibration being dependent upon the current velocity of the tactile mouse 650 in its planar workspace 605. When the tactile mouse 650 is stationary, the vibration is deactivated; as the mouse moves faster, the frequency and magnitude of the vibration is increased. This sensation can be controlled locally by the device processor 750, or be controlled by the computer 150. Local control by the device may eliminate communication burden in some embodiments.

Other spatial force sensations besides textures can also be output. In addition, any of the described haptic sensations herein can be output by tactile actuator 660 simultaneously or otherwise combined as desired.

In another version of the invention the simulation system 100 may comprise a haptic interface 140 comprising a version of a mouse 600 mat has kinesthetic force feedback capabilities. FIG. 16 shows a kinesthetic force feedback mouse 800 to which one or more grounded forces may be applied, for example by being applied in the lateral or the x and y directions.

FIG. 16 is a perspective view of a kinesthetic force feedback mouse 800 (hereinafter force feedback mouse 800) as a user object 130 and optionally as part of a haptic interface 140 according to an embodiment of the present invention. The force feedback mouse 800 in this version is movable in relation to another portion of the interface device 140.

Force feedback mouse 800 is an object that is preferably grasped or gripped or contacted to be manipulated by a user, as discussed above in connection with the tactile mouse 650. For example, images may be displayed and/or modified on the display screen 155 of the computer 150 in response to such manipulations. In the described embodiment, force feedback mouse 800 is shaped so that a user's fingers or hand may comfortably grasp the object and move it in the provided degrees of freedom in physical space. For example, a user can move force feedback mouse 800 to correspondingly move a computer generated graphical object, such as a cursor or other image, in a graphical environment provided by the computer 150. The available degrees of freedom in which force feedback mouse 800 can be moved are determined from the haptic interface, described below. In addition, force feedback mouse 800 may include one or more buttons 620a-620e, as described above and to be described in further detail below, to allow the user to provide additional commands to the computer 150. The force feedback mouse 800 may also include additional buttons.

Electronic interface 810 interfaces mechanical and electrical input and output between the force feedback mouse 800 and the computer 150 implementing the application program, such as the simulation, a GUI, or game environment. Electronic interface 810 provides multiple degrees of freedom to force feedback mouse 800; in the preferred embodiment, two linear, planar degrees of freedom are provided to the mouses as shown by arrows 630. In other embodiments, greater or fewer degrees of freedom can be provided, as well as rotary degrees of freedom.

In one version, the user manipulates force feedback mouse 800 in a planar workspace, much like a traditional mouse, and the position of force feedback mouse 800 is translated into a form suitable for interpretation by position sensors of the electronic interface 810. The sensors track the movement of the force feedback mouse 800 in planar space and provide suitable electronic signals to an electronic portion of electronic interface 810. The electronic interface 810 provides position information to the computer 150. In addition, the computer 150 and/or electronic interface 810 provide force feedback signals to actuators coupled to electronic interface 810, and the actuators generate forces on members of the mechanical portion of the electronic interface 810 to provide forces on force feedback mouse 800 in provided or desired degrees of freedom. The user experiences the forces generated on the force feedback mouse 800 as realistic simulations of force sensations such as jolts, springs, textures, "barrier" forces, and the like. Since the housing of the force feedback mouse 800 is in contact with the palm of a user, the force feedback mouse housing may serve as a palm forcing mechanism 180.

The electronic portion of electronic interface 810 may couple the mechanical portion of the interface to the computer 150. The electronic portion may be included within the housing 815 of the electronic interface 810 or, alternatively, the electronic portion may be included in the computer 150 or as a separate unit with its own housing. Electronic interface 810 may include a local microprocessor distinct and separate from a microprocessor in the computer 150. The local microprocessor may be used to control force feedback on force feedback mouse 800 independently of the host computer, as well as sensor and actuator interfaces that convert electrical signals to appropriate forms usable by the mechanical portion of electronic interface 810 and the computer 150. For example, a rigid surface may be generated on computer screen 155 and a graphical image 115 controlled by the user may be caused to interact with, for example by intersecting, the surface. In this embodiment, high-level host commands can be used to provide the various forces associated with the rigid surface. The local control mode using a local microprocessor in electronic interface 810 can be helpful in increasing the response time for forces applied to the user object, which is essential in creating realistic and accurate force feedback. For example, the computer 150 may send a "spatial representation" to the local microprocessor, which is data describing the locations of some or all the graphical objects displayed in a graphical environment 110 which are associated with forces and the types/characteristics of graphical objects, such as a graphical object 120, in the graphical environment 110. The microprocessor can store such a spatial representation in local memory, and thus will be able to determine interactions between the user object and graphical objects (such as the rigid surface) independently of the computer 150. In addition, the microprocessor can be provided with the necessary instructions or data to check sensor readings, determine cursor and target positions, and determine output forces independently of the computer 150. The computer 150 could implement program functions (such as displaying images) when appropriate, and synchronization commands can be communicated between the microprocessor and computer 150 to correlate the microprocessor and computer processes. Also, the local memory can store predetermined force sensations for the microprocessor that are to be associated with particular types of or portions of the graphical object 120. Alternatively, the computer 150 can directly send force feedback signals to the electronic interface 810 to generate forces on force feedback mouse 800.

The electronic interface 810 can be coupled to the computer 150 by a bus 205, which communicates signals between electronic interface 810 and computer 150 and also may provide power to the electronic interface 810 (e.g. when bus 205 includes a USB interface). In other embodiments, signals can be sent between electronic interface 810 and computer 150 by wireless transmission/reception. In an embodiment of the present invention, the electronic interface 810 serves as an input/output (I/O) device for the computer 150. The electronic interface 810 can also receive inputs from other input devices or controls that are associated with the haptic interface 140 and can relay those inputs to the computer 150. For example, commands sent by the user activating a button on force feedback mouse 800 can be relayed to computer 150 by electronic interface 810 to implement a command or cause the computer 150 to output a command to the electronic interface 810.

There are two primary "control paradigms" of operation for the force feedback mouse 800: position control and rate control. Position control is the more typical control paradigm for mouse and similar controllers, and refers to a mapping of force feedback mouse 800 in which displacement of the force feedback mouse 800 in physical space directly dictates displacement of the graphical image 115. The mapping can have an arbitrary scale factor or even be non-linear, but the fundamental relation between mouse displacements, and graphical object displacements should be present. Under a position control mapping, the graphical image 115 does not move unless the force feedback mouse 800 is in motion. Position control is commonly used for virtual reality simulations. Position control force feedback roughly corresponds to forces which would be perceived directly by the user, i.e., they are "user-centric" forces. Also, "ballistics" or other non-linear adjustments to cursor position can be used, in which, for example, small motions of the mouse have a different scaling factor for cursor movement than large motions of the mouse, to allow more control of small cursor movement. As shown in FIG. 16, the computer 150 may have its own "host frame" which is displayed on the display screen 155 and represented by the coordinates u,v. In contrast, the force feedback mouse 800 has its own "local frame" in which the force feedback mouse 800 is moved and represented by coordinates x,y. In a position control paradigm, the position (or change in position) of a user-controlled graphical object such as a cursor, in host frame corresponds to a position (or change in position) of the force feedback mouse 800 in the local frame. The offset between the object in the host frame and the object in the local frame can be changed by the user for. Rate control may also or alternatively be also used as a control paradigm. This refers to a mapping in which the displacement of the force feedback mouse 800 along one or more provided degrees of freedom is abstractly mapped to motion of a computer-simulated object under control. There is not a direct physical mapping between physical object (mouse) motion and computer object motion. Thus, most rate control paradigms are fundamentally different from position control in that the user object can be held steady at a given position but the controlled computer object is in motion at a commanded or given velocity, while the position control paradigm only allows the controlled computer object to be in motion if the user object is in motion.

Force feedback mouse 800 may be supported upon a grounded pad 820 which helps define the planar workspace 605. Pad 820 or a similar surface is supported by grounded surface 825. Force feedback mouse 800 contacts grounded pad 820 (or alternatively grounded surface 825) to provide additional support for the mouse and relieve stress on any mechanical support structures.

The haptic interface comprising a force feedback mouse may also include an indexing function or "indexing mode" which allows the user to redefine the offset between the positions of the force feedback mouse 800 in the local frame and a graphical image 115, in the host frame displayed by the computer 150. Indexing is inherently provided with a traditional position control device such as a standard mouse. When a physical limit to the mouse's movement is reached, the user typically lifts the mouse from the contacted surface and places the mouse in a different position to allow more room to move the mouse. While the mouse is off the contacted surface, no input is provided to control the graphical image. Force feedback mouse 800 of the present invention also has a limit to movement in the provided planar workspace provided by a guide opening, as detailed below. To allow movement of the graphical image in the host frame past the limits of the mouse local frame, "indexing" is implemented. In one implementation, the user may reposition the force feedback mouse 800 without moving the controlled graphical image or providing any other input to the computer, thus allowing the user to redefine the offset between the object's position and the graphical image's position. This is analogous to standard mouse indexing. In the present invention, such indexing is achieved through an input device such as a button, or alternatively using switches, pressure sensors, optical sensors, contact sensors, voice recognition hardware, or other input devices. As long as the indexing button or device is activated, the force feedback mouse 800 is in indexing mode and can be moved without providing any input to the host computer (e.g., without moving the controlled graphical object). When the button is released (or indexing mode otherwise exited), the position of the graphical image is again controlled by the position of the force feedback mouse 800. Alternatively, the user might toggle indexing mode and non-indexing mode with one press of a button or other input device. Indexing mode can be performed directly by the computer 150, or a local microprocessor can perform the indexing function. For example, the local processor can determine when indexing mode is active, and simply not report the position of the force feedback mouse 800 to the computer 150 while such mode is active. A hand weight switch may also be provided for indexing purposes, as described in U.S. Pat. Nos. 5,825,308 and 6,100,874, both of which are incorporated herein by reference in their entireties.

FIG. 17A is a perspective view of an embodiment of the haptic interface 140 with the cover portion of housing 815 and the grounded pad 820 removed. Force feedback mouse 800 is coupled to a mechanical interface 830, which includes a mechanical linkage 835 that is coupled to a transducer assembly 840. A base 845 is provided to support the mechanical linkage 835 and transducer assembly 840 on grounded surface 825. In the described embodiment, the linkage 835 allows force feedback mouse 800 two planar degrees of freedom in the directions of arrows 630, and the members of the linkage 835 move, approximately within a plane. The linkage is preferably coupled to grounded base 845 at an axis of rotation, described below. The transducer assembly 840 is coupled to base 845 and is thus also grounded.

In the described embodiment, at least part of the electronic interface 810 is positioned above the transducer assembly 840. For example, a printed circuit board 850 or similar support can be positioned over the top surface of transducer assembly 840. A number of integrated circuits and other components 855 can be coupled to the printed circuit board 850. This configuration allows the transducer assembly 840 and the electronic interface 810 to conform to a small volume which reduces the overall size of housing 815 and allows the mouse interface device to be positioned in convenient areas of a desktop or other area accessible to a user.

FIG. 17B is a perspective view of a portion of the mouse device 800 of FIG. 16 showing the mechanical interface 830 for providing mechanical input and output in accordance with the present invention. Mechanical linkage 835 provides support for force feedback mouse 800 and couples the mouse to a grounded surface 825, such as a tabletop or other support. Linkage 835 is, in the described embodiment, a 5-member (or "5-bar") linkage including a base 845, a first base member 860 coupled to base 845, a second base member 865 coupled to base 845, a first link member 870 coupled to first base member 860, and a second link member 875 coupled to first link member 870 and second base member 865. In the described embodiment, the first base member 860 and the first link member 870 are arranged generally symmetric to the second base member 865 and the second link member 875 across an axis extending perpendicularly through axes A and D. The symmetrical orientation of the members allows first base member 860 and first link member 870, in some embodiments, to be manufactured substantially in identical fashion as second base member 865 and second link member 875, thus saving on manufacturing costs. Force feedback mouse 800 is coupled to the linkage at the coupling between link members 870, 875. Fewer or greater numbers of members in the linkage can be provided in alternate embodiments. Base 845 of the linkage 835 is a base for the support of the linkage and is coupled to or resting on a ground surface 825. The base 845 in FIG. 11b is shown as a plate or base that extends under force feedback mouse 800.

The members of linkage 835 are rotatably coupled to one another through the use of rotatable pivots or bearing assemblies having one or more bearings, all referred to as "bearings" herein. Linkage 835 is rotatably coupled to base 845 by a grounded bearing 880 and can rotate about an axis A. First link member 870 is rotatably coupled to first base member 860 by bearing 885 and can rotate about a floating axis B, and first base member 865 is rotatably coupled to base 845 by bearing 880 and can rotate about axis A. Second link member 875 is rotatably coupled to second base member 865 by bearing 890 and can rotate about floating axis C, and second link member 875 is also rotatably coupled to first link member 870 by bearing 895 such that second link member 875 and first link member 870 may rotate relative to each other about floating axis D. In an alternate embodiment, a parallel linkage may be used as disclosed in U.S. Pat. No. 6,100,874, which is incorporated herein by reference in its entirety. The axes B, C, and D are "floating" in the sense that they are not fixed in one position relative to ground surface 825 as is axis A. Since the only connection of the four linkage members to the base 845 is through grounded bearing 880, only base members 860, 865 are grounded at axis A. Bearings 885, 890, and 895 are floating and not connected to the ground member. Preferably, the axes B, C, and D are all substantially parallel to each other.

Linkage 835 is formed as a five-member closed-loop chain. Each member in the chain is rotatably coupled to two other members of the chain. The five-member linkage is arranged such that the members can rotate about their respective axes to provide force feedback mouse 800 with two degrees of freedom, i.e., force feedback mouse 800 can be moved within a planar workspace defined by the x-y plane, which is defined by the x- and y-axes as shown in FIG. 17B. Linkage 835 is thus a "planar" five-member linkage, since it allows the force feedback mouse 800 to be moved within a plane. In addition, in the described embodiment, the members of linkage 835 are themselves approximately oriented in a plane.

Force feedback mouse 800 in this embodiment is coupled to link members 870, 875 by rotary bearing 895, for example at attachment plate 900. The mouse may also preferably rotate about floating axis D and allow the user some flexible movement in the planar workspace. The allowed rotation can provided to allow the user's hand/wrist to conveniently stay in one position during mouse movement while the force feedback mouse 800 rotates about axis D. In alternate embodiments, mouse rotation about axis D may be sensed by sensors. In yet other embodiments, forces can be provided on force feedback mouse 800 about axis D using actuators. In the preferred embodiment, a pad or other support is provided under force feedback mouse 800 to help support the force feedback mouse 800, and is described in greater detail with respect to FIG. 17C.

Transducer assembly 840 is used to sense the position of force feedback mouse 800 in its workspace and to generate forces oh the force feedback mouse 800. Transducer assembly 840 may include one or more sensors 905a, 905b and/or one or more actuators 910a, 910b. The sensors 905a, 905b collectively sense the movement of the force feedback mouse 800 in the provided degrees of freedom and send appropriate signals to the electronic interface 810. Sensor 905a senses movement of second base member 865 about axis A, and sensor 905b senses movement of first base member 860 about axis A. These sensed positions about axis A allow the determination of the position of force feedback mouse 800 using known constants such as the lengths of the members of linkage 835 and using well-known coordinate transformations. Member lengths particular to the interface device can be stored in a memory, such as EEPROM, to account for manufacturing variations among different interface devices; alternatively, variations of the particular link lengths from standard lengths can be stored in memory.

Sensors 905a, 905b are, in the described embodiment, grounded optical encoders that sense the intermittent blockage of an emitted beam. A grounded emitter/detector portion 915 includes an emitter that emits a beam which is detected by a grounded detector. A moving encoder disk portion or "arc" is provided at the end of members 860, 868 which each block the beam for the respective sensor in predetermined spatial increments and allows a processor to determine the position of the arc and thus the members 860,865 by counting the spatial increments. Also, a velocity of members 860, 865 based, on the speed of passing encoder marks can also be determined. In one embodiment, dedicated electronics such as a "haptic accelerator" may determine velocity and/or acceleration, as disclosed in U.S. Pat. No. 5,999,168 which is incorporated herein by reference in its entirety.

In the version shown, transducer assembly 840 also includes actuators 910a, 910b to transmit forces to force feedback mouse 800 in space, i.e., in two (or more) degrees of freedom of the user object. The bottom housing plate 920 of actuator 910a is rigidly coupled to base 845 (or grounded surface 825) and a moving portion of actuator 910a (for example a coil) is integrated into the base 845. The actuator 910a transmits rotational forces to first base member 860 about axis A. The housing 920 of the grounded portion of actuator 910b is rigidly coupled to base 845 or ground surface 825 through the grounded housing of actuator 910b, and a moving portion (for example a coil) of actuator 910b is integrated into second base member 865. Actuator 910b transmits rotational forces to second base member 865 about axis A. The combination of these rotational forces about axis A allows forces to be transmitted to force feedback mouse 800 in all directions in the planar workspace provided by linkage 835 through the rotational interaction of the members of linkage 835.

The operation of exemplary sensors 905a, 905b and actuators 910a, 910b are described in greater detail in U.S. Pat. Nos. 5,166,723 and 5,100,874, both of which are incorporated herein by reference in their entireties. Additional and/or different mechanisms can also be employed to provide desired degrees of freedom to force feedback mouse 800. This rotational degree of freedom can also be sensed and/or actuated, if desired, to provide an additional control degree of freedom. In other embodiments, a floating gimbal mechanism can be included between force feedback mouse 800 and linkage 835 to provide additional degrees of freedom to force feedback mouse 800. Optionally, additional transducers can be also added to electronic interface 810 in provided or additional degrees of freedom of force feedback mouse 800. In an alternate embodiment, the mechanism can be used for a 3-D interface device that allows a user to move a user object in three dimensions rather than the 2-D planar workspace disclosed. For example, in one embodiment, the entire mechanism can be made to rotate about a grounded axis, such as axis H extending through the actuators 910. For example, members (not shown) rigidly coupled to the actuators 910 or to base 845 can extend in both directions along axis H and be rotary coupled to a grounded surface at points H1 and H2. This provides a third (rotary) degree of freedom about axis H. A motor can be grounded to the surface near point H1 or H2 and can drive the mechanism about axis H, and a sensor, such as a rotary encoder, can sense motion in this third degree of freedom. One reason for providing axis H through the magnet assemblies is to reduce the inertia and weight contributed to motion about axis H by the magnet assemblies. Axis H can be provided in other positions M other embodiments. In such an embodiment, the user object 130 can be a stylus, grip, or other user object. A third linear degree of freedom to mechanism can be provided in alternate embodiments. One embodiment of a planar linkage providing three degrees of freedom is disclosed in co-pending patent application Ser. No. 08/736, 161 filed Oct. 25, 1996 and hereby incorporated by reference herein in its entirety.

FIG. 17C is a perspective view of the grounded pad 820 and electronic interface 810 of the mouse system, where the force feedback mouse 800 has been detached from the mechanical linkage 835. As shown, pad 820 preferably has a height hand may be hollow to allow the mechanical linkage 835 to be positioned underneath the top surface of the pad 820. The bearing 895 may be arranged to extend through a guide opening 925 in the pad 820. An attachment plate 900 can be coupled to the bearing 895 or rotatably coupled to a member of linkage 835 to provide a point for attaching the force feedback mouse 800 to the linkage 835. in one version, the force feedback mouse 800 is releasably coupled to attachment plate 900. In the described embodiment, the opening 925 provides the limits to the workspace of the force feedback mouse 800. Bearing 895 and plate 900 protrude through opening 925 such that a rounded portion of plate 900 (provided under the flat plate portion), when moved in any degree of freedom of the force feedback mouse 800, eventually impacts a side of opening 925. The four sides to the opening 925 thus provide limits to the workspace of the force feedback mouse 800 in the provided planar degrees of freedom, i.e., a stop mechanism is provided that limits the movement of the force feedback mouse 800 as defined by the size of opening 925. Opening 925 can be made any size desired. For example, in the described embodiment, opening 925 has relatively small dimensions, such as approximately 1⅜" by 1⅛". The size of the opening 925 is larger than the workspace of the mouse due to the size or radius of the rounded portion; thus, with the described opening size, a workspace of about 1" by ¾" is obtained for the force feedback mouse 800 (which is considered at the center of bearing 895 at axis D). This is typically adequate workspace for the user to move the mouse and control a graphical object such as a graphical image 115 on a display screen 155. In addition, this size workspace has an aspect ratio of 4:3, which is about the aspect ratio of a standard computer monitor, television, or other display screen. An aperture 930 can also be provided to route wires or cables from buttons, for example, on the mouse to the electronic interface 810. Alternatively, an inductive coil can be included in force feedback mouse 800 to transmit a signal when a button is activated, where the signal is received by another inductive coil in pad 820 which detects the activation of buttons, the operation of such coils being well known to those skilled in the art. Other wireless devices can also be used.

The top surface of grounded pad 820 may be a smooth material, such as a smooth slick plastic, to allow contact with portions of force feedback mouse 800. Such contact provides support for force feedback mouse 800 when the mouse is moved in its planar workspace and allows the mouse to slide on the pad 820 with little friction. Since the linkage 835, when extended, is cantilevered at a large moment arm, a small force at the mouse end of the linkage can create a large torque that stresses the mounting or coupling 880 at axis A, which may use the mounting or coupling to bend. Pad 820 thus balances the cantilever load by providing support to any pressure or force from the user in the z-direction on force feedback mouse 800 toward the ground surface 825.

FIG. 18 is a block diagram illustrating a version of the haptic interface 140 comprising an electronic interface 810 and a mechanical interface 830 usable with the version of the invention shown in FIGS. 10, and 11*a*-11*c*. The simulation system 100 includes a computer 150 and the haptic interface 140. The computer 150 may include a host microprocessor 940, random access memory (RAM) 945, read-only memory (ROM) 950, input/output (I/O) electronics 955, a clock 960, a display device 155, and an audio output device 965. Host microprocessor 940 can include a variety of available microprocessors from Intel, AMD, Motorola, or other manufacturers. Host microprocessor 940 can be single microprocessor chip, or can include multiple primary and/or co-processors. Host microprocessor 940 preferably retrieves and stores instructions and other necessary data from RAM 945 and ROM 950 as is well known to those skilled in the art. In the described embodiment, the computer 150 can receive sensor data or a sensor signal via a bus 205. Host microprocessor 940 can receive data from bus 205 using I/O electronics 955, and can use I/O electronics to control other peripheral devices. The computer 150 can also output commands to haptic interface device 140 via bus 205 to cause force feedback for the simulation system 100.

Clock 960 is a standard clock crystal or equivalent component used by the computer 150 to provide timing to electrical signals used by host microprocessor 940 and other components of the computer 150. Clock 960 is accessed by the computer 150 in the control process of the present invention to provide timing information that may be necessary in determining force or position, e.g., calculating a velocity or acceleration from position values.

Display device 155 is similar to that described above. Audio output device 965, such as speakers, can be coupled to host microprocessor 940 via amplifiers, filters, and other circuitry well known to those skilled in the art. Host processor 940 outputs signals to speakers 965 to provide sound output to the user when an "audio event" occurs during the implementation of the host application program. Other types of peripherals can also be coupled to host processor 940, such as storage devices (hard disk drive, CD ROM drive, floppy disk drive, etc.), printers, and other input and output devices.

Haptic interface 140 includes an electronic interface 810 and a mechanical interface 830 (which each may include both electronic and mechanical components). The electronic interface 810 is coupled to the computer 150 by a bi-directional bus 205. The bi-directional bus 205 sends signals in either direction between the computer 150 and the interface device 140. Bus 205 can be a serial interface bus, as discussed above. A USB may serve as the serial interface bus to also source power to drive actuators 910 and other devices. Since each device that accesses the USB is assigned a unique USB address by the computer 150, this allows multiple devices to share the same bus. In addition, the USB standard includes timing data that is encoded along with differential data.

The electronic interface 810 includes a local microprocessor 970, local clock 975, local memory 980, sensor interface 985, and actuator interface 990. Electronic interface 810 may also include additional electronic components for communicating via standard protocols on bus 205. In various embodiments, electronic interface 810 can be included in mechanical interface 830, in the computer 150, or in its own separate housing. Different components of electronic interface 810 can be included in interface 830 or the computer 150 if desired.

Local microprocessor 970 may be coupled to bus 205 and may be closely linked to mechanical interface 830 to allow quick communication with other components of the interface device. Processor 970 is considered "local" to haptic interface 140, where "local" herein refers to processor 970 being a separate processor, such as a microprocessor, from a processor 940 in the computer 150. "Local" may also refer to processor 970 being dedicated to force feedback and sensor I/O of the haptic interface 140, and being closely coupled to sensors and actuators of the mechanical interface 830, such as within the housing of or in a housing coupled closely to interface 830. Microprocessor 970 can be provided with software instructions to wait for commands or requests from the computer 150, parse/decode the command or request, and handle/control input and output signals according to the command or request. In addition, processor 970 may operate independently of the computer 150 by reading sensor signals and calculating appropriate forces from those sensor signals, time signals, and force processes selected in accordance with a host command, and output appropriate control signals to the actuators. Suitable microprocessors for use as local microprocessor 970 include the MC68HC711E9 by Motorola and the PIC16C74 by Microchip, for example. Microprocessor 970 can include one microprocessor chip, or multiple processors and/or co-processor chips. In other embodiments, microprocessor 970 can include digital signal processor (DSP) functionality.

For example, in one host-controlled embodiment that utilizes a local microprocessor 970, the computer 150 can provide low-level force commands over bus 205, which microprocessor 970 directly transmits to the actuators 910. In a different local control embodiment, the computer 150 provides, high level supervisory commands to microprocessor 970 over bus 205, and microprocessor 970 manages low level force control loops to sensors and actuators in accordance with the high level commands and independently of the computer 150. In the local control embodiment, the microprocessor 970 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or kinesthetic forces simulating interactions between displayed objects in the graphical environment 110. An "enclosure" host command can also be provided, which causes the microprocessor 970 to define a box-like enclosure in a graphical environment 110, where the enclosure has sides characterized by wall and texture forces, as described in U.S. Pat. No. 6,100,874 which is incorporated herein by reference in its entirety. The computer 150 can send the local processor 970 a spatial layout of objects, such as a graphical object 120 in the graphical environment 110 so that the microprocessor 970 has a mapping of locations of graphical objects like enclosures and can determine interactions with the graphical image 115 locally. Force feedback used in graphical environments is described in greater detail in U.S. Pat. Nos. 5,629,594 and 5,825,308, both of which are incorporated by reference herein in their entireties.

Sensor signals used by microprocessor 970 are also reported to the computer 150, which updates a host application program and outputs force control signals as appropriate. For example, if the user moves force feedback mouse 800, the computer 150 receives position and/or other signals indicating this movement or manipulation of the user object 130 and can move a displayed graphical image 115 in response. In an alternate embodiment, no local microprocessor is included in the haptic interface 140, and the computer 150 directly controls and processes all signals to and from the electronic interface 810 and mechanical interface 830.

A local clock 975 can be coupled to the microprocessor 970 to provide timing, data, similar to system clock 960 of the computer 150, the timing data might be required, for example, to compute forces output by actuators 910 (e.g., forces dependent on calculated velocities or other time dependent factors). In alternate embodiments using the USB communication interface, timing data for microprocessor 970 can be retrieved from the USB interface. Local memory 980, such as RAM and/or ROM, may be coupled to microprocessor 970 in to store instructions for microprocessor 970 and store temporary and other data. Microprocessor 970 may also store calibration parameters in a local memory 980 such as an EEPROM. As described above, link or member lengths or manufacturing variations and/or variations in coil winding or magnet strength can be stored. If analog sensors are used, adjustments to compensate for sensor variations can be included, e.g. implemented as a look up table for sensor variation over the user object workspace. Memory 980 may be used to store the state of the force feedback device, including a reference position, current control mode or configuration, etc.

Sensor interface 985 may optionally be included in electronic interface 810 to convert sensor signals to signals that can be interpreted by the microprocessor 970 and/or the computer 150. For example, sensor interface 985 can receive signals from a digital sensor such as an encoder and convert the signals into a digital binary number representing the position of a member or component of mechanical apparatus 830. An analog to digital converter (ADC) in sensor interface 985 can convert a received analog signal to a digital signal for microprocessor 970 and/or the computer 150. Such circuits, or equivalent circuits, are well known to those skilled in the art. Alternately, microprocessor 970 can perform these interface functions without the need for a separate sensor interface 985. Alternatively, sensor signals from the sensors 905 can be provided directly to the computer 150, bypassing microprocessor 970 and sensor interface 985. Other types of interface circuitry can also be used.

Actuator interface 990 can be optionally connected between the actuators 910 and microprocessor 970. Actuator interface 990 converts signals from microprocessor 970 into signals appropriate to drive the actuators. Actuator interface 990 can include power amplifiers, switches, digital to analog controllers (DACs), and other components. Such interfaces are well known to those skilled in the art. In alternate embodiments, actuator interface 970 circuitry can be provided within microprocessor 970 or in the actuators 910.

In the described embodiment, power is supplied to the actuators 910 and any other components (as required) by the USB. Since the electromagnetic actuators of the described embodiment have a limited physical range and need only output, for example, about 3 ounces of force to create realistic force sensations on the user, very little power is needed. A large power supply thus need not be included in interface system or as an external power adapter. For example, one way to draw additional power from the USB is to the haptic interface 140 to appear as more than one peripheral to the computer 150; for example, each provided degree of freedom of force feedback mouse 800 can be configured as a different peripheral and receive its own allocation of power. Alternatively, power from the USB can be stored and regulated and thus used when needed to drive actuators 910. For example, power can be stored over time and then immediately dissipated to provide a jolt force to the user object 130. A battery or a capacitor circuit, for example, can store energy and discharge or dissipate the energy when power is required by the system and/or when enough power has been stored. Alternatively, a power supply 995 can optionally be coupled to actuator interface 990 and/or actuators 910 to provide electrical power. Power supply 995 can be included within the housing of the haptic interface device 140, or can be provided as a separate component, for example, connected by an electrical power cord. The power storage embodiment described above, using a battery or capacitor circuit, can also be used in non-USB embodiments to allow a smaller power supply 995 to be used.

Mechanical interface 830 is coupled to the electronic interface 810 and may include sensors 905, actuators 910, and linkage 835. These components are described in detail above. Sensors 905 sense the position, motion, and/or other characteristics of force feedback mouse 800 along one or more degrees of freedom and provide signals to microprocessor 970 including information representative of those characteristics. Typically, a sensor 905 is provided for each degree of freedom along which force feedback mouse 800 can be moved, or, a single compound sensor can be used for multiple degrees of freedom. Example of sensors suitable for embodiments described herein are optical encoders, as described above. Linear optical encoders may similarly sense the change in position of force feedback mouse 800 along a linear degree of freedom. Alternatively, analog sensors such as potentiometers can be used. It is also possible to use non-contact sensors at different positions relative to mechanical interface 830, such as Hall effect magnetic sensors for detecting magnetic fields from objects, or an optical sensor such as a lateral effect photo diode having an emitter/detector pair. In addition, velocity sensors (e.g., tachometers) for measuring velocity of force feedback mouse 800 and/or acceleration sensors (e.g., accelerometers) for measuring acceleration of force feedback mouse 800 can be used. Furthermore, either relative or absolute sensors can be employed.

Actuators 910 transmit forces to force feedback mouse 800 in one or more directions along one or more degrees of freedom in response to signals output by microprocessor 970 and/or the computer 150, i.e., they are "computer controlled." Typically, an actuator 910 is provided for each degree of freedom along which forces are desired to be transmitted. Actuators 910 can include active actuators, such as linear current control motors, stepper motors, pneumatic/hydraulic active actuators, a torquer (motor with limited angular range), a voice coil actuator as described in the embodiments above, and/or other types of actuators that transmit a force to an object. Passive actuators can include magnetic particle brakes, friction brakes, or pneumatic/hydraulic passive actuators, and generate a damping resistance or friction in a degree, of motion. For example, an electrorheological fluid can be used in a passive damper, which is a fluid that has a viscosity that can be changed by an electric field. Likewise, a magnetorheological fluid can be used in a passive damper, which is a fluid that has a viscosity that can be changed by a magnetic field. These types of dampers can be used instead of or in addition to other types of actuators in the mouse interface device. In yet other embodiments, passive damper elements can be provided on the bearings of interface 830 to remove energy from the system and intentionally increase the dynamic stability of the mechanical system. In addition, in voice coil embodiments, multiple wire coils can be provided, where some of the coils can be used to provide back EMF and damping forces. In some embodiments, all or some of sensors 905 and actuators 910 can be included together as a sensor/actuator pair transducer.

The mechanism 835 may be the five-member linkage 835 described above, but can also be one of several types of mechanisms. Force feedback mouse 800 can alternatively be a puck, joystick, or other device or article coupled to linkage 835, as described above.

Other input devices 1000 can optionally be included in system 100 and send input signals to microprocessor 970 and/or the computer 150. Such input devices can include buttons, such as buttons on force feedback mouse 800, used to supplement the input from the user to a simulation, GUI, game, etc, as will be discussed. Also, dials, switches, voice recognition hardware (with software implemented by computer 150), or other input mechanisms can be used.

Safety or "deadman" switch 1005 may be included in haptic interface device 140 to provide a mechanism to allow a user to override and deactivate actuators 910, or require a user to activate actuators 910, for safety reasons, as discussed above.

In one version of the invention, a mouse 600, which/may be either a tactile mouse 250 or a force feedback mouse 800, is used to control the display of a graphical hand 170. Movement of the mouse 600 controls the positioning of the graphical hand 170 in the graphical environment 110. For example, in one version, the two dimensional position of the mouse 600 directly controls the two-dimensional displayed position of the graphical hand 170. In more complex version, the mouse 600 may be positionable in three dimensions and/or may to rotatable about one or more axes to control the three dimensional position and/or the orientation of the graphical hand 170, as will be described.

In one version, one or more of the buttons 620 may be used to control the shape of the graphical hand 115. Accordingly, when a button is depressed, the display of the shape of the graphical hand 170 may change. For example, a binary button, i.e. a button that is either "on" or "off" may be provided. When depressed, or when in the "on" condition, the graphical hand may be displayed in a grasping condition. In another version, a sensor, such as an analog sensor, is positioned to detect the amount of depression of the button 620 and the displayed graphical hand 170 shows the variable amount of grasping in response to the depression. For example, as shown in FIG. 19A, a sliding member 1050 may be connected to the interior of a button, such as button 620a, which is hingedly connected to the housing of the mouse 600. Much of the interior of the mouse 600 is not shown for clarity. Alternatively, the button may be slidingly connected to the mouse 600 housing. The sliding member 1050 slides within a sensor 1060. The sensor 1060 may comprise, for example, a potentiometer, an encoder, LVDT, of similar device. A signal from the sensor 1060 is transmitted to the computer 150 which uses the signal to control the display of the graphical hand 170. In one version, the graphical hand may comprise three displayed positions. The first position is an open hand and is displayed when the button 620a has not been depressed a predetermined amount. When the button 620a reaches the predetermined amount, the graphical hand 170 is shown in a semi-closed position. When the button 620*a* is further depressed to a second predetermined position, a closed hand is shown. In more advanced versions, the display of the grasping action can be directly related to the amount of depression of the button 620*a*.

An actuator 1070 may be provided, as shown schematically in FIG. 19A, to provide a haptic sensation to the button 630*a*. For example, a haptic sensation may be provided to simulate a resistive grasping force, indicating to the user that an object is being grasped. Alternatively or additionally, tactile sensations such as vibrations may be output to the button to provide various indications to the user. FIG. 19B shows another version of a button sensor 1060 and a button actuator 1070 embodied in a motor/encoder pair. The button actuator 1070 comprises a motor having a rotatable shaft 1065 connected to a toothed wheel 1090. The teeth on the toothed wheel engaging teeth 1080 on an extension member 1085 to allow the motor to drive the button 630*a*, optionally in either direction. An encoder or the like is positioned to detect rotation of the shaft and to correlate the detected rotation to a position of the button 630*a*. Another version of a button actuator 1070 is shown in FIG. 19C. In this version, the button actuator 1070 comprises a deformable leaf spring 110 that may be actuated by pulling on tendon 250 in the direction of arrow 1105, as discussed above in connection with FIGS. 4A-4C and 5A-5B. In addition, a motor or the like may be positioned within the mouse 600 or exterior to the mouse 600 and may comprise a position detector, such as an encoder, that may be used to detect a position of the button 630*a* since the linear position of the tendon 250 is related to the depressed position of the button 630*a*.

In another version, the depression of a button 620 may result in the bending of a finger on the graphical hand 170. In one version, such as the version shown in FIG. 12, a button depression sensor is provided for all five fingers, each finger being able to independently control the bending of corresponding fingers on the graphical hand 170. Accordingly, a user may depress button 620*a*, for example, and the graphical hand's index finger may be displayed as bending. Optionally, each button 630 may also be provided with an actuator to provide a haptic sensation to each of the fingers. In an advanced version, each actuator is independently controllable to provide independent haptic sensations to each of the fingers. These sensations may also be provided in addition to the haptic sensations provided to the palm through the housing of the mouse and in addition to any kinesthetic force feedback that is provided to the user.

Another version of a finger sensing mouse is shown in FIGS. 20A and 20B. In this version, a finger receiving extension 1110 is attached to the button 620*a*. The finger receiving extension 1110 includes a ring 1115 and a link 1120 connecting the ring 1115 to the button 620*a*, as can be seen in FIG. 20B which shows the view from the perspective of B-B in FIG. 20A. With this version, the user inserts his or her finger into the ring 1115. Accordingly, the user is able to manipulate the button 620*a* in both directions, rather than just depression of the button 620*a*. Accordingly, the user can actively open a closed graphical hand 170. Optionally, an actuator 1070, such as the actuator shown in FIG. 19B, may be provided to apply forces to the finger in both directions. Alternatively, the button may be removed and replaced with a linear or curved rod 1125 that extends through the housing of the mouse 600 and is engaged by a sensor 1060 and/or an actuator 1070, as shown in FIG. 21. In another version, as shown in FIG. 22, the finger receiving extension 110 may comprise a ring 1115 mounted to an articulated linkage 1130 which is mounted on the mouse 600, for example by being mounted on the housing of the mouse 600. The linkage 1130 may include any number of revolute joints 1135, such as three as shown. An encoder or other type sensor may detect the angular position of the revolute joints 1135 to determine the position of the ring 115 and thereby determine the position of the finger of the user. In another version, each revolute joint 1115 is provided with a rotary actuator, such as a motor, to provide force feedback to the finger. Alternatively to the configuration shown in FIG. 22, a five-bar linkage, with the housing of the mouse 600 being one of the bars, may be used to provide position sensing and actuation of the finger. In one version, a revolute joint 1140 is provided to detect rotation of the ring 1115 about axes that lie in the plane of the cross-section of FIG. 22. Additionally or alternatively, a linkage may be provided that is allows the ring 1115 to move perpendicularly to the plane of the cross-section of FIG. 22, and the ring 115 may be sensed and/or forced in that movement. This version allows for the detection of spreading of the fingers and crossing of the fingers. The finger receiving extensions of FIGS. 20 through 22 may be provided any number of fingers of the user, including all five fingers of the hand of the user. In another version, the linkage 1130 may be connected to a grounded member instead of to the mouse 600. In another version, the linkage 1130 may be connected to the user, for example by being connected to the wrist or hand of the user as described in U.S. Pat. No. 6,110,130 which is incorporated herein by reference in its entirety.

Another version of a finger sensing button 620*a* is shown in FIGS. 23A and 23B. This version comprises an articulated button 1150. The articulated button 1150 comprises a first portion 1160 is articulatable relative to a second button portion 1170. The first button portion 1160 may be adapted to contact a first finger portion 1165 and the second button portion 1170 may be adapted to contact a second finger portion 1170. In this way, the position of the finger tip may be detected and the relative positions of the first and second portions of the fingers can be detected. A more complex version includes three articulated button portions. Optionally one or more actuators may be provided to apply a force to the finger through one or more of the portions.

FIG. 24 shows a mouse 600, capable of sensed movement in three dimensions. Movement in two dimensions may be provided by a mechanism a mechanical interface 830 similar to that shown in FIG. 17. However, instead of being connected directly to the mouse 600, the mechanical interface 830 is connected to a z-axis translation member 1200. The z-axis translation member 1200 in the version shown comprises telescoping rods 1210,1220. The top rod 1210 is connected to the mouse 600. Thus, the mouse 600 may be moved in three dimensions. A linear potentiometer or encoder or the like may be positioned to detect the displacement of the telescoping rods 1210,1220 in order to generate a signal that may be used by the computer to control the graphical image 115 in a third dimension. Also, a linear motor, or the like, may be provided to apply force feedback to the mouse 600 in a third linear dimension. In addition, rotation of the mouse 600 about the z-axis can be sensed by measuring the rotation between the telescoping rods 1210,1220 and by non-rotatably connecting the base 1230 of the mouse 600 to the top rod 1210. If desired, an articulation 1250 may be provided to allow the mouse 600 to rotate about the x axis, and an articulation 1260 may be provided to allow the mouse 600 to rotate about the y axis. These articulations may also include a rotation sensor to control the display of the graphical image 115 and/or a rotary actuator to provide force feedback in these additional degrees of freedom. In one version, the mouse 600 is capable of up to six degrees of freedom of movement, is sensed in up to six degrees of freedom, is forced in up to six degrees of freedom, and includes from one to five finger sensing buttons 620. Alternatively, a three dimensional linkage system such as those described in U.S. Pat. Nos. 5,701,140 and 5,625,576, which are incorporated herein by reference in their entireties, may be used. In these version, a mouse 600 with one or more finger sensing buttons 620 may be mounted on the linkage.

Graphical image controlling mouse alternatives are shown in FIGS. 25A through 25C. In the version of FIG. 25A, an orientation ball 1300 is provided at the distal end of the mouse 600 instead of or in addition to the finger sensing buttons 620. FIG. 25B shows a frontal view of the mouse 600 of FIG. 25A with a user grasping the orientation ball 1300 with his or her thumb and first two fingers. By rotating the orientation ball about the longitudinal axis of the mouse 600, for example, the user can control the orientation of the graphical image 115 about an axis. A retainer 1310 may be rotatable so as to not interfere with the motion of the fingers. In another version, the orientation ball 1300 is rotatable about three orthogonal axes, in a manner similar to a track ball, to control the orientation of the graphical image 115 in about three orthogonal axes. Alternatively, as shown in FIG. 25C, an additional orientation of the graphical image 115 can be controlled by rotating the mouse 600. The rotation can be detected by providing two longitudinally spaced mouse balls 665, 665'. By comparing the position signals from the two balls 665, 665', the orientation of the mouse 600 can be determined. This orientation can then be used by the computer 150 to update the display of the graphical image 115, such as a graphical hand 170, accordingly.

In one version of the invention, a networked connection may be provided, for example as described in U.S. patent application Ser. No. 09/153,781 filed on Sep. 16,1998, which is incorporated herein by reference in its entirety. In this version, a user may download an application program, such as a virtual reality simulation program, or a file of haptic sensations from a remote location. Also, a user may interact with a simulation running at a remote location. In another version, the haptic interface may be used as a master device to control a remote slave device. The slave device may be representative of the user's hand or fingers for example, and the user may control the slave to, for example, perform a procedure at a remote location. In an advanced version, the slave device may be equipped with sensors to detect conditions of the slave device, such as pressures or forces. The sensed conditions may then be used to provide haptic sensations to the user via the master device, the haptic sensations being related to the sensed conditions of the slave device.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the haptic interface of the present invention and many different types actuators and user objects can be used, including the use of two user objects to detect manipulation of both hand of a user. In addition, the haptic interface can be replaced by a non-haptic interface, for example, when the mapping of the graphical image is broken. Furthermore, certain terminology, such as terms like x, y, z, left, right, up, down, etc., has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. An interface device for interfacing a user with a computer, the computer running an application program and generating a graphical image and a graphical object, the interface deice comprising:
    a user manipulatable object in communication with the computer;
    a sensor to detect a manipulation of the object, the sensor providing a signal to the computer to control the graphical image; and
    an actuator adapted to provide a haptic sensation to the palm of the user in relation to an interaction between the graphical image and the graphical object, the actuator comprising a member that is deformable to provide the haptic sensation.

2. The interface device of claim 1, wherein the member is bowed to provide the haptic sensation.

3. The interface device of claim 1, wherein the member is biased away from the palm of the user.

4. The interface device of claim 1 wherein the graphical image is a graphical hand and wherein the haptic sensation is provided to the user when the graphical hand grasps the graphical object.

5. The interface device of claim 1 wherein the user manipulatable object comprises an instrumented glove.

6. An actuator for providing a haptic sensation to a user interfacing with a computer running an application program, the actuator comprising:
    a deformable member having a first end, a second end, and an intermediate portion; and
    a tendon capable of displacing the first end relative to the second end in response to the computer to cause the intermediate portion to contact the user and thereby provide a haptic sensation to the user.

7. The actuator of claim 6, wherein the deformable member is a leaf spring.

8. The actuator of claim 6, wherein the tendon passes through a guide member fixed to the first or second end of the deformable member.

9. The actuator of claim 6 wherein the deformable member is capable of providing a tactile sensation to the user.

10. The actuator of claim 6 wherein the deformable member is capable of providing a tactile sensation to the user.

11. A mouse for interfacing a user with a computer generating a graphical environment comprising a graphical hand, the mouse comprising:
    a housing;
    a position detector to detect a position of the mouse, the position detector capable of providing a first position signal to the computer to control the position of the graphical hand in the graphical environment; and
    a finger position detector to detect a position of a finger of the user, the finger position detector capable of providing a second position signal to the computer to control a graphical finger on the graphical hand in relation to the position of the finger of the user.

12. The mouse of claim 11 further comprising an actuator capable of providing a haptic sensation to the finger of the user.

13. The mouse of claim 12, wherein the actuator comprises a deformable member.

14. The mouse of claim 11 further comprising a position detector for each finger on the hand of the user.

15. The mouse of claim 11 wherein the finger position detector comprises a button on the mouse.

16. The mouse of claim 15, wherein the button comprises first and second sensing portions.

* * * * *